United States Patent
White

(10) Patent No.: US 10,356,032 B2
(45) Date of Patent: Jul. 16, 2019

(54) SYSTEM AND METHOD FOR DETECTING CONFIDENTIAL INFORMATION EMAILS

(71) Applicant: PALANTIR TECHNOLOGIES, INC., Palo Alto, CA (US)

(72) Inventor: Nicholas White, London (GB)

(73) Assignee: Palantir Technologies Inc., Palo Alto, CA (US)

( * ) Notice: Subject to any disclaimer, the term of this patent is extended or adjusted under 35 U.S.C. 154(b) by 94 days.

(21) Appl. No.: 14/141,252

(22) Filed: Dec. 26, 2013

(65) Prior Publication Data

US 2015/0188872 A1 Jul. 2, 2015

(51) Int. Cl.
G06F 15/16 (2006.01)
H04L 12/58 (2006.01)
G06Q 10/10 (2012.01)
H04L 12/24 (2006.01)

(52) U.S. Cl.
CPC ............. *H04L 51/28* (2013.01); *G06Q 10/10* (2013.01); *G06Q 10/107* (2013.01); *H04L 41/0816* (2013.01)

(58) Field of Classification Search
CPC .. G06Q 10/107; G06Q 10/10; H04L 41/0816; H04L 12/585; H04L 51/12; H04L 12/58
USPC .......................................................... 709/206
See application file for complete search history.

(56) References Cited

U.S. PATENT DOCUMENTS

| | | |
|---|---|---|
| 5,109,399 A | 4/1992 | Thompson |
| 5,329,108 A | 7/1994 | Lamoure |
| 5,632,009 A | 5/1997 | Rao et al. |
| 5,670,987 A | 9/1997 | Doi et al. |
| 5,781,704 A | 7/1998 | Rossmo |
| 5,798,769 A | 8/1998 | Chiu et al. |
| 5,845,300 A | 12/1998 | Comer |
| 5,978,475 A | 11/1999 | Schneier et al. |
| 6,057,757 A | 5/2000 | Arrowsmith et al. |
| 6,091,956 A | 7/2000 | Hollenberg |
| 6,161,098 A | 12/2000 | Wallman |
| 6,219,053 B1 | 4/2001 | Tachibana et al. |
| 6,232,971 B1 | 5/2001 | Haynes |
| 6,247,019 B1 | 6/2001 | Davies |
| 6,253,203 B1 | 6/2001 | O'Flaherty et al. |
| 6,279,018 B1 | 8/2001 | Kudrolli et al. |

(Continued)

FOREIGN PATENT DOCUMENTS

| | | |
|---|---|---|
| AU | 2014250678 | 2/2016 |
| CN | 101729531 | 6/2010 |

(Continued)

OTHER PUBLICATIONS

US 8,712,906 B1, 04/2014, Sprague et al. (withdrawn)

(Continued)

*Primary Examiner* — Razu A Miah
(74) *Attorney, Agent, or Firm* — Knobbe, Martens, Olson & Bear LLP

(57) ABSTRACT

Systems and methods are disclosed for detecting confidential information emails. In accordance with one implementation, a method is provided for detecting confidential information emails. The method includes obtaining a sender address of an electronic message, the sender address comprising a first username and a first domain name, and obtaining at least one recipient address of the electronic message, the recipient address comprising a second username and a second domain name. The method also includes determining whether the recipient address and the sender address are different addresses of a user, and based on the determination, flagging the electronic message.

21 Claims, 4 Drawing Sheets

(56) References Cited

U.S. PATENT DOCUMENTS

| | | |
|---|---|---|
| 6,341,310 B1 | 1/2002 | Leshem et al. |
| 6,366,933 B1 | 4/2002 | Ball et al. |
| 6,369,835 B1 | 4/2002 | Lin |
| 6,374,251 B1 | 4/2002 | Fayyad et al. |
| 6,385,619 B1 | 5/2002 | Eichstaedt et al. |
| 6,430,305 B1 | 8/2002 | Decker |
| 6,456,997 B1 | 9/2002 | Shukla |
| 6,549,944 B1 | 4/2003 | Weinberg et al. |
| 6,560,620 B1 | 5/2003 | Ching |
| 6,567,936 B1 | 5/2003 | Yang et al. |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,674,434 B1 | 1/2004 | Chojnacki et al. |
| 6,714,936 B1 | 3/2004 | Nevin, III |
| 6,725,240 B1 | 4/2004 | Asad et al. |
| 6,775,675 B1 | 8/2004 | Nwabueze et al. |
| 6,807,569 B1 | 10/2004 | Bhimani et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,978,419 B1 | 12/2005 | Kantrowitz |
| 6,980,984 B1 | 12/2005 | Huffman et al. |
| 6,985,950 B1 | 1/2006 | Hanson et al. |
| 7,017,046 B2 | 3/2006 | Doyle et al. |
| 7,036,085 B2 | 4/2006 | Barros |
| 7,043,702 B2 | 5/2006 | Chi et al. |
| 7,055,110 B2 | 5/2006 | Kupka et al. |
| 7,069,586 B1 | 6/2006 | Winneg et al. |
| 7,139,800 B2 | 11/2006 | Bellotti et al. |
| 7,158,878 B2 | 1/2007 | Rasmussen et al. |
| 7,162,475 B2 | 1/2007 | Ackerman |
| 7,168,039 B1 | 1/2007 | Bertram |
| 7,171,427 B2 | 1/2007 | Witowski et al. |
| 7,225,468 B2 | 5/2007 | Waisman et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,373,669 B2 | 5/2008 | Eisen |
| 7,379,811 B2 | 5/2008 | Rasmussen et al. |
| 7,379,903 B2 | 5/2008 | Caballero et al. |
| 7,426,654 B2 | 9/2008 | Adams et al. |
| 7,451,397 B2 | 11/2008 | Weber et al. |
| 7,454,466 B2 | 11/2008 | Bellotti et al. |
| 7,461,077 B1 | 12/2008 | Greenwood |
| 7,467,375 B2 | 12/2008 | Tondreau et al. |
| 7,487,139 B2 | 2/2009 | Fraleigh et al. |
| 7,496,567 B1 | 2/2009 | Steichen |
| 7,502,786 B2 | 3/2009 | Liu et al. |
| 7,525,422 B2 | 4/2009 | Bishop et al. |
| 7,529,727 B2 | 5/2009 | Arning et al. |
| 7,529,734 B2 | 5/2009 | Dirisala |
| 7,558,677 B2 | 7/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,756,843 B1 * | 7/2010 | Palmer .............. G06F 17/30864 707/694 |
| 7,770,032 B2 | 8/2010 | Nesta et al. |
| 7,770,100 B2 | 8/2010 | Chamberlain et al. |
| 7,774,431 B2 * | 8/2010 | Conn .................... G06Q 10/10 709/219 |
| 7,783,658 B1 | 8/2010 | Bayliss |
| 7,801,871 B2 | 9/2010 | Gosnell |
| 7,805,457 B1 | 9/2010 | Viola et al. |
| 7,809,703 B2 | 10/2010 | Balabhadrapatruni et al. |
| 7,814,102 B2 | 10/2010 | Miller et al. |
| 7,818,658 B2 | 10/2010 | Chen |
| 7,870,493 B2 | 1/2011 | Pall et al. |
| 7,894,984 B2 | 2/2011 | Rasmussen et al. |
| 7,899,611 B2 | 3/2011 | Downs et al. |
| 7,899,796 B1 | 3/2011 | Borthwick et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,941,321 B2 | 5/2011 | Greenstein et al. |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,036,632 B1 | 10/2011 | Cona et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,046,362 B2 | 10/2011 | Bayliss |
| 8,054,756 B2 | 11/2011 | Chand et al. |
| 8,103,543 B1 | 1/2012 | Zwicky |
| 8,134,457 B2 | 3/2012 | Velipasalar et al. |
| 8,135,679 B2 | 3/2012 | Bayliss |
| 8,135,719 B2 | 3/2012 | Bayliss |
| 8,145,703 B2 | 3/2012 | Frishert et al. |
| 8,181,253 B1 | 5/2012 | Zaitsev et al. |
| 8,185,819 B2 | 5/2012 | Sah et al. |
| 8,190,893 B2 | 5/2012 | Benson et al. |
| 8,196,184 B2 | 6/2012 | Amirov et al. |
| 8,214,361 B1 | 7/2012 | Sandler et al. |
| 8,214,490 B1 | 7/2012 | Vos et al. |
| 8,214,764 B2 | 7/2012 | Gemmell et al. |
| 8,225,201 B2 | 7/2012 | Michael |
| 8,229,902 B2 | 7/2012 | Vishniac et al. |
| 8,229,947 B2 | 7/2012 | Fujinaga |
| 8,230,333 B2 | 7/2012 | Decherd et al. |
| 8,239,668 B1 | 8/2012 | Chen et al. |
| 8,266,168 B2 | 9/2012 | Bayliss |
| 8,271,461 B2 | 9/2012 | Pike et al. |
| 8,280,880 B1 | 10/2012 | Aymeloglu et al. |
| 8,290,838 B1 | 10/2012 | Thakur et al. |
| 8,290,926 B2 | 10/2012 | Ozzie et al. |
| 8,290,942 B2 | 10/2012 | Jones et al. |
| 8,301,464 B1 | 10/2012 | Cave et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,321,943 B1 | 11/2012 | Walters et al. |
| 8,347,398 B1 | 1/2013 | Weber |
| 8,352,881 B2 | 1/2013 | Champion et al. |
| 8,368,695 B2 | 2/2013 | Howell et al. |
| 8,386,377 B1 | 2/2013 | Xiong et al. |
| 8,397,171 B2 | 3/2013 | Klassen et al. |
| 8,412,707 B1 | 4/2013 | Mianji |
| 8,447,674 B2 | 5/2013 | Choudhuri et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,473,454 B2 | 6/2013 | Evanitsky et al. |
| 8,484,115 B2 | 7/2013 | Aymeloglu et al. |
| 8,484,168 B2 | 7/2013 | Bayliss |

(56) References Cited

U.S. PATENT DOCUMENTS

| | | |
|---|---|---|
| 8,489,331 B2 | 7/2013 | Kopf et al. |
| 8,489,641 B1 | 7/2013 | Seefeld et al. |
| 8,495,077 B2 | 7/2013 | Bayliss |
| 8,498,969 B2 | 7/2013 | Bayliss |
| 8,498,984 B1 | 7/2013 | Hwang et al. |
| 8,510,743 B2 | 8/2013 | Hackborn et al. |
| 8,514,082 B2 | 8/2013 | Cova et al. |
| 8,515,207 B2 | 8/2013 | Chau |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,560,413 B1 | 10/2013 | Quarterman |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,600,872 B1 | 12/2013 | Yan |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,683,322 B1 | 3/2014 | Cooper |
| 8,688,573 B1 | 4/2014 | Rukonic et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,769,412 B2 | 7/2014 | Gill et al. |
| 8,781,169 B2 | 7/2014 | Jackson et al. |
| 8,782,794 B2 | 7/2014 | Ramcharran |
| 8,787,939 B2 | 7/2014 | Papakipos et al. |
| 8,788,405 B1 | 7/2014 | Sprague et al. |
| 8,788,407 B1 | 7/2014 | Singh et al. |
| 8,799,799 B1 | 8/2014 | Cervelli et al. |
| 8,806,355 B2 | 8/2014 | Twiss et al. |
| 8,812,960 B1 | 8/2014 | Sun et al. |
| 8,818,892 B1 | 8/2014 | Sprague et al. |
| 8,830,322 B2 | 9/2014 | Nerayoff et al. |
| 8,832,594 B1 | 9/2014 | Thompson et al. |
| 8,868,537 B1 | 10/2014 | Colgrove et al. |
| 8,917,274 B2 | 12/2014 | Ma et al. |
| 8,924,388 B2 | 12/2014 | Elliot et al. |
| 8,924,389 B2 | 12/2014 | Elliot et al. |
| 8,924,872 B1 | 12/2014 | Bogomolov et al. |
| 8,931,043 B2 | 1/2015 | Cooper et al. |
| 8,937,619 B2 | 1/2015 | Sharma et al. |
| 8,938,686 B1 | 1/2015 | Erenrich et al. |
| 8,949,164 B1 | 2/2015 | Mohler |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,043,696 B1 | 5/2015 | Meiklejohn et al. |
| 9,043,894 B1 | 5/2015 | Dennison et al. |
| 9,049,117 B1 | 6/2015 | Nucci et al. |
| 9,069,842 B2 | 6/2015 | Melby |
| 9,100,428 B1 | 8/2015 | Visbal |
| 9,111,281 B2 | 8/2015 | Stibel et al. |
| 9,116,975 B2 | 8/2015 | Shankar et al. |
| 9,129,219 B1 | 9/2015 | Robertson et al. |
| 9,135,658 B2 | 9/2015 | Sprague et al. |
| 9,146,954 B1 | 9/2015 | Boe et al. |
| 9,165,299 B1 | 10/2015 | Stowe et al. |
| 9,171,334 B1 | 10/2015 | Visbal et al. |
| 9,177,344 B1 | 11/2015 | Singh et al. |
| 9,202,249 B1 | 12/2015 | Cohen et al. |
| 9,230,280 B1 | 1/2016 | Maag et al. |
| 9,256,664 B2 | 2/2016 | Chakerian et al. |
| 9,335,897 B2 | 5/2016 | Goldenberg |
| 9,338,013 B2 | 5/2016 | Castellucci et al. |
| 9,619,557 B2 | 4/2017 | Kesin et al. |
| 9,875,293 B2 | 1/2018 | Chakerian et al. |
| 9,881,074 B2 | 1/2018 | Chakerian et al. |
| 2002/0029248 A1* | 3/2002 | Cook ................ G06Q 10/107 709/206 |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095360 A1 | 7/2002 | Joao |
| 2002/0095658 A1 | 7/2002 | Shulman |
| 2002/0103705 A1 | 8/2002 | Brady |
| 2002/0112157 A1 | 8/2002 | Doyle et al. |
| 2002/0116120 A1 | 8/2002 | Ruiz et al. |
| 2002/0147805 A1 | 10/2002 | Leshem et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0033228 A1 | 2/2003 | Bosworth-Davies et al. |
| 2003/0036848 A1 | 2/2003 | Sheha et al. |
| 2003/0039948 A1 | 2/2003 | Donahue |
| 2003/0074368 A1 | 4/2003 | Schuetze et al. |
| 2003/0097330 A1 | 5/2003 | Hillmer et al. |
| 2003/0126102 A1 | 7/2003 | Borthwick |
| 2003/0140106 A1 | 7/2003 | Raguseo |
| 2003/0144868 A1 | 7/2003 | MacIntyre et al. |
| 2003/0163352 A1 | 8/2003 | Surpin et al. |
| 2003/0225755 A1 | 12/2003 | Iwayama et al. |
| 2003/0229848 A1 | 12/2003 | Arend et al. |
| 2004/0032432 A1 | 2/2004 | Baynger |
| 2004/0034570 A1 | 2/2004 | Davis |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0111410 A1 | 6/2004 | Burgoon et al. |
| 2004/0111480 A1* | 6/2004 | Yue ................ H04L 29/06 709/206 |
| 2004/0123139 A1 | 6/2004 | Aiello et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0153418 A1 | 8/2004 | Hanweck |
| 2004/0163039 A1 | 8/2004 | Gorman |
| 2004/0193600 A1 | 9/2004 | Kaasten et al. |
| 2004/0205524 A1 | 10/2004 | Richter et al. |
| 2004/0221223 A1 | 11/2004 | Yu et al. |
| 2004/0230577 A1 | 11/2004 | Kawatani |
| 2004/0236688 A1 | 11/2004 | Bozeman |
| 2004/0250124 A1 | 12/2004 | Chesla et al. |
| 2004/0260702 A1 | 12/2004 | Cragun et al. |
| 2004/0267746 A1 | 12/2004 | Marcjan et al. |
| 2005/0010472 A1 | 1/2005 | Quatse et al. |
| 2005/0021635 A1* | 1/2005 | Graham ................ G06F 21/10 709/206 |
| 2005/0027705 A1 | 2/2005 | Sadri et al. |
| 2005/0028094 A1 | 2/2005 | Allyn |
| 2005/0039119 A1 | 2/2005 | Parks et al. |
| 2005/0065811 A1 | 3/2005 | Chu et al. |
| 2005/0078858 A1 | 4/2005 | Yao et al. |
| 2005/0080769 A1 | 4/2005 | Gemmell |
| 2005/0086207 A1 | 4/2005 | Heuer et al. |
| 2005/0108063 A1 | 5/2005 | Madill et al. |
| 2005/0125715 A1 | 6/2005 | Di Franco et al. |
| 2005/0154628 A1 | 7/2005 | Eckart et al. |
| 2005/0154769 A1 | 7/2005 | Eckart et al. |
| 2005/0157662 A1 | 7/2005 | Bingham et al. |
| 2005/0162523 A1 | 7/2005 | Darrell et al. |
| 2005/0166144 A1 | 7/2005 | Gross |
| 2005/0169274 A1* | 8/2005 | Shuster ............ H04L 29/12066 370/392 |
| 2005/0180330 A1 | 8/2005 | Shapiro |
| 2005/0182764 A1 | 8/2005 | Evans |
| 2005/0182793 A1 | 8/2005 | Keenan et al. |
| 2005/0183005 A1 | 8/2005 | Denoue et al. |
| 2005/0204006 A1* | 9/2005 | Purcell ................ G06Q 10/107 709/206 |
| 2005/0204009 A1* | 9/2005 | Hazarika ............ G06Q 10/107 709/206 |
| 2005/0210409 A1 | 9/2005 | Jou |
| 2005/0222928 A1 | 10/2005 | Steier et al. |
| 2005/0229256 A2 | 10/2005 | Banzhof |
| 2005/0246327 A1 | 11/2005 | Yeung et al. |
| 2005/0251786 A1 | 11/2005 | Citron et al. |

(56) References Cited

U.S. PATENT DOCUMENTS

| | | |
|---|---|---|
| 2005/0262556 A1 | 11/2005 | Waisman et al. |
| 2005/0275638 A1 | 12/2005 | Kolmykov-Zotov et al. |
| 2006/0026120 A1 | 2/2006 | Carolan et al. |
| 2006/0026170 A1 | 2/2006 | Kreitler et al. |
| 2006/0026246 A1* | 2/2006 | Fukuhara .......... H04L 51/12 709/206 |
| 2006/0031928 A1 | 2/2006 | Conley et al. |
| 2006/0059139 A1 | 3/2006 | Robinson |
| 2006/0069912 A1 | 3/2006 | Zheng et al. |
| 2006/0074881 A1 | 4/2006 | Vembu et al. |
| 2006/0080283 A1 | 4/2006 | Shipman |
| 2006/0080619 A1 | 4/2006 | Carlson et al. |
| 2006/0093222 A1 | 5/2006 | Saffer et al. |
| 2006/0095521 A1 | 5/2006 | Patinkin |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0149596 A1 | 7/2006 | Surpin et al. |
| 2006/0168066 A1* | 7/2006 | Helsper .......... G06Q 10/107 709/206 |
| 2006/0179003 A1 | 8/2006 | Steele et al. |
| 2006/0184889 A1 | 8/2006 | Molander |
| 2006/0203337 A1 | 9/2006 | White |
| 2006/0209085 A1 | 9/2006 | Wong et al. |
| 2006/0212931 A1 | 9/2006 | Shull et al. |
| 2006/0218637 A1 | 9/2006 | Thomas et al. |
| 2006/0241974 A1 | 10/2006 | Chao et al. |
| 2006/0242040 A1 | 10/2006 | Rader |
| 2006/0242630 A1 | 10/2006 | Koike et al. |
| 2006/0265747 A1 | 11/2006 | Judge |
| 2006/0271277 A1 | 11/2006 | Hu et al. |
| 2006/0279630 A1 | 12/2006 | Aggarwal et al. |
| 2007/0000999 A1 | 1/2007 | Kubo et al. |
| 2007/0011150 A1 | 1/2007 | Frank |
| 2007/0011304 A1 | 1/2007 | Error |
| 2007/0016363 A1 | 1/2007 | Huang et al. |
| 2007/0038646 A1 | 2/2007 | Thota |
| 2007/0038962 A1 | 2/2007 | Fuchs et al. |
| 2007/0057966 A1 | 3/2007 | Ohno et al. |
| 2007/0078832 A1 | 4/2007 | Ott et al. |
| 2007/0083541 A1 | 4/2007 | Fraleigh et al. |
| 2007/0094389 A1 | 4/2007 | Nussey et al. |
| 2007/0106582 A1 | 5/2007 | Baker et al. |
| 2007/0112867 A1 | 5/2007 | Evans et al. |
| 2007/0143851 A1 | 6/2007 | Nicodemus |
| 2007/0150369 A1 | 6/2007 | Zivin |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0174760 A1 | 7/2007 | Chamberlain et al. |
| 2007/0185867 A1 | 8/2007 | Maga |
| 2007/0192122 A1 | 8/2007 | Routson et al. |
| 2007/0192265 A1 | 8/2007 | Chopin et al. |
| 2007/0198571 A1 | 8/2007 | Ferguson et al. |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0266336 A1 | 11/2007 | Nojima et al. |
| 2007/0284433 A1 | 12/2007 | Domenica et al. |
| 2007/0294200 A1 | 12/2007 | Au |
| 2007/0294643 A1 | 12/2007 | Kyle |
| 2007/0294766 A1 | 12/2007 | Mir et al. |
| 2008/0028100 A1* | 1/2008 | Adelman .......... G06Q 10/107 709/245 |
| 2008/0040275 A1 | 2/2008 | Paulsen et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0065655 A1 | 3/2008 | Chakravarthy et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0104019 A1 | 5/2008 | Nath |
| 2008/0104063 A1 | 5/2008 | Gallivan et al. |
| 2008/0104407 A1 | 5/2008 | Horne et al. |
| 2008/0126951 A1 | 5/2008 | Sood et al. |
| 2008/0133567 A1 | 6/2008 | Ames et al. |
| 2008/0148397 A1* | 6/2008 | Litvin .......... G06Q 10/107 726/22 |
| 2008/0148398 A1 | 6/2008 | Mezack et al. |
| 2008/0155440 A1 | 6/2008 | Trevor et al. |
| 2008/0162616 A1 | 7/2008 | Gross et al. |
| 2008/0195417 A1 | 8/2008 | Surpin et al. |
| 2008/0195608 A1 | 8/2008 | Clover |
| 2008/0201580 A1 | 8/2008 | Savitzky et al. |
| 2008/0208735 A1 | 8/2008 | Balet et al. |
| 2008/0222295 A1 | 9/2008 | Robinson et al. |
| 2008/0222706 A1 | 9/2008 | Renaud et al. |
| 2008/0229422 A1 | 9/2008 | Hudis et al. |
| 2008/0249983 A1 | 10/2008 | Meisels et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0288425 A1 | 11/2008 | Posse et al. |
| 2008/0294663 A1 | 11/2008 | Heinley et al. |
| 2008/0301643 A1 | 12/2008 | Appleton et al. |
| 2008/0313132 A1 | 12/2008 | Hao et al. |
| 2009/0002492 A1 | 1/2009 | Velipasalar et al. |
| 2009/0018940 A1 | 1/2009 | Wang et al. |
| 2009/0024505 A1 | 1/2009 | Patel et al. |
| 2009/0027418 A1 | 1/2009 | Maru et al. |
| 2009/0030915 A1 | 1/2009 | Winter et al. |
| 2009/0044279 A1 | 2/2009 | Crawford et al. |
| 2009/0055251 A1 | 2/2009 | Shah et al. |
| 2009/0082997 A1 | 3/2009 | Tokman et al. |
| 2009/0083184 A1 | 3/2009 | Eisen |
| 2009/0088964 A1 | 4/2009 | Schaaf et al. |
| 2009/0094270 A1 | 4/2009 | Alirez et al. |
| 2009/0103442 A1 | 4/2009 | Douville |
| 2009/0106178 A1 | 4/2009 | Chu |
| 2009/0112745 A1 | 4/2009 | Stefanescu |
| 2009/0119309 A1 | 5/2009 | Gibson et al. |
| 2009/0125359 A1 | 5/2009 | Knapic |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0157732 A1 | 6/2009 | Hao et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0172821 A1 | 7/2009 | Daira et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0187546 A1 | 7/2009 | Whyte et al. |
| 2009/0187548 A1 | 7/2009 | Ji et al. |
| 2009/0192957 A1 | 7/2009 | Subramanian et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0228701 A1 | 9/2009 | Lin |
| 2009/0234720 A1 | 9/2009 | George et al. |
| 2009/0249244 A1 | 10/2009 | Robinson et al. |
| 2009/0254842 A1 | 10/2009 | Leacock et al. |
| 2009/0254970 A1 | 10/2009 | Agarwal et al. |
| 2009/0254971 A1 | 10/2009 | Herz |
| 2009/0271343 A1 | 10/2009 | Vaiciulis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0307049 A1 | 12/2009 | Elliott et al. |
| 2009/0313463 A1 | 12/2009 | Pang et al. |

(56) References Cited

U.S. PATENT DOCUMENTS

| | | |
|---|---|---|
| 2009/0318775 A1 | 12/2009 | Michelson et al. |
| 2009/0319418 A1 | 12/2009 | Herz |
| 2009/0319891 A1 | 12/2009 | MacKinlay |
| 2009/0328222 A1 | 12/2009 | Helman et al. |
| 2010/0005146 A1* | 1/2010 | Drako ............... G06Q 10/00 709/206 |
| 2010/0011282 A1 | 1/2010 | Dollard et al. |
| 2010/0017360 A1* | 1/2010 | Bansal ............... H04L 51/12 707/E17.044 |
| 2010/0030722 A1 | 2/2010 | Goodson et al. |
| 2010/0031141 A1 | 2/2010 | Summers et al. |
| 2010/0042922 A1 | 2/2010 | Bradeteanu et al. |
| 2010/0057622 A1 | 3/2010 | Faith et al. |
| 2010/0057716 A1 | 3/2010 | Stefik et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0077481 A1 | 3/2010 | Polyakov et al. |
| 2010/0077483 A1 | 3/2010 | Stolfo et al. |
| 2010/0098318 A1 | 4/2010 | Anderson |
| 2010/0100957 A1* | 4/2010 | Graham ............... G06Q 10/107 726/22 |
| 2010/0100963 A1 | 4/2010 | Mahaffey |
| 2010/0103124 A1 | 4/2010 | Kruzeniski et al. |
| 2010/0106611 A1 | 4/2010 | Paulsen et al. |
| 2010/0106752 A1 | 4/2010 | Eckardt et al. |
| 2010/0114887 A1 | 5/2010 | Conway et al. |
| 2010/0122152 A1 | 5/2010 | Chamberlain et al. |
| 2010/0125546 A1 | 5/2010 | Barrett et al. |
| 2010/0131457 A1 | 5/2010 | Heimendinger |
| 2010/0131502 A1 | 5/2010 | Fordham |
| 2010/0161735 A1 | 6/2010 | Sharma |
| 2010/0162176 A1 | 6/2010 | Dunton |
| 2010/0169237 A1 | 7/2010 | Howard et al. |
| 2010/0179831 A1 | 7/2010 | Brown et al. |
| 2010/0185691 A1 | 7/2010 | Irmak et al. |
| 2010/0191563 A1 | 7/2010 | Schlaifer et al. |
| 2010/0198684 A1 | 8/2010 | Eraker et al. |
| 2010/0199225 A1 | 8/2010 | Coleman et al. |
| 2010/0211535 A1 | 8/2010 | Rosenberger |
| 2010/0228812 A1 | 9/2010 | Uomini |
| 2010/0235915 A1 | 9/2010 | Memon et al. |
| 2010/0250412 A1 | 9/2010 | Wagner |
| 2010/0262688 A1 | 10/2010 | Hussain et al. |
| 2010/0280857 A1 | 11/2010 | Liu et al. |
| 2010/0293174 A1 | 11/2010 | Bennett et al. |
| 2010/0306029 A1 | 12/2010 | Jolley |
| 2010/0306713 A1 | 12/2010 | Geisner et al. |
| 2010/0312837 A1* | 12/2010 | Bodapati ............ G06F 17/30864 709/206 |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0004498 A1 | 1/2011 | Readshaw |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0060910 A1 | 3/2011 | Gormish et al. |
| 2011/0061013 A1 | 3/2011 | Billicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0087519 A1 | 4/2011 | Fordyce, III et al. |
| 2011/0093327 A1 | 4/2011 | Fordyce et al. |
| 2011/0099133 A1 | 4/2011 | Chang et al. |
| 2011/0110633 A1 | 5/2011 | Erlendsson |
| 2011/0117878 A1 | 5/2011 | Barash et al. |
| 2011/0119100 A1 | 5/2011 | Ruhl et al. |
| 2011/0131122 A1 | 6/2011 | Griffin et al. |
| 2011/0131279 A1* | 6/2011 | Karnik ............... G06Q 10/107 709/206 |
| 2011/0131547 A1 | 6/2011 | Elaasar |
| 2011/0137766 A1 | 6/2011 | Rasmussen et al. |
| 2011/0153384 A1 | 6/2011 | Horne et al. |
| 2011/0161096 A1 | 6/2011 | Buehler et al. |
| 2011/0167105 A1 | 7/2011 | Ramakrishnan et al. |
| 2011/0167493 A1 | 7/2011 | Song et al. |
| 2011/0170799 A1 | 7/2011 | Carrino et al. |
| 2011/0173032 A1 | 7/2011 | Payne et al. |
| 2011/0173093 A1 | 7/2011 | Psota et al. |
| 2011/0178842 A1 | 7/2011 | Rane et al. |
| 2011/0181598 A1 | 7/2011 | O'Neall et al. |
| 2011/0185316 A1 | 7/2011 | Reid et al. |
| 2011/0202555 A1 | 8/2011 | Cordover et al. |
| 2011/0208565 A1 | 8/2011 | Ross et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0218955 A1 | 9/2011 | Tang |
| 2011/0219321 A1 | 9/2011 | Gonzalez et al. |
| 2011/0219450 A1 | 9/2011 | McDougal et al. |
| 2011/0225198 A1 | 9/2011 | Edwards et al. |
| 2011/0225650 A1 | 9/2011 | Margolies et al. |
| 2011/0231223 A1 | 9/2011 | Winters |
| 2011/0238413 A1 | 9/2011 | Wu et al. |
| 2011/0238495 A1 | 9/2011 | Kang |
| 2011/0238510 A1 | 9/2011 | Rowen et al. |
| 2011/0238553 A1 | 9/2011 | Raj et al. |
| 2011/0238570 A1 | 9/2011 | Li et al. |
| 2011/0246229 A1 | 10/2011 | Pacha |
| 2011/0251951 A1 | 10/2011 | Kolkowtiz |
| 2011/0258158 A1 | 10/2011 | Resende et al. |
| 2011/0258272 A1* | 10/2011 | Drako ............... G06Q 10/107 709/206 |
| 2011/0270604 A1 | 11/2011 | Qi et al. |
| 2011/0270705 A1 | 11/2011 | Parker |
| 2011/0270834 A1* | 11/2011 | Sokolan ............... G06F 17/30707 707/737 |
| 2011/0271349 A1* | 11/2011 | Kaplan ............... H04L 51/12 726/26 |
| 2011/0276638 A1* | 11/2011 | Errico ............... G06Q 10/107 709/206 |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0295649 A1 | 12/2011 | Fine |
| 2011/0307382 A1 | 12/2011 | Siegel et al. |
| 2011/0310005 A1 | 12/2011 | Chen et al. |
| 2011/0314007 A1 | 12/2011 | Dassa et al. |
| 2011/0314024 A1 | 12/2011 | Chang et al. |
| 2012/0004904 A1 | 1/2012 | Shin et al. |
| 2012/0011238 A1 | 1/2012 | Rathod |
| 2012/0011245 A1* | 1/2012 | Gillette ............... G06Q 10/107 709/224 |
| 2012/0019559 A1 | 1/2012 | Siler et al. |
| 2012/0022945 A1 | 1/2012 | Falkenborg et al. |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0066296 A1 | 3/2012 | Appleton et al. |
| 2012/0072825 A1 | 3/2012 | Sherkin et al. |
| 2012/0075324 A1 | 3/2012 | Cardno et al. |
| 2012/0079363 A1 | 3/2012 | Folting et al. |
| 2012/0079592 A1 | 3/2012 | Pandrangi |
| 2012/0084117 A1 | 4/2012 | Tavares et al. |
| 2012/0084118 A1 | 4/2012 | Bai et al. |
| 2012/0084135 A1 | 4/2012 | Nissan et al. |
| 2012/0084287 A1 | 4/2012 | Lakshminarayan et al. |
| 2012/0084866 A1 | 4/2012 | Stolfo |
| 2012/0106801 A1 | 5/2012 | Jackson |
| 2012/0110674 A1 | 5/2012 | Belani et al. |
| 2012/0117082 A1 | 5/2012 | Koperda et al. |
| 2012/0131512 A1 | 5/2012 | Takeuchi et al. |
| 2012/0137235 A1 | 5/2012 | Ts et al. |

(56) References Cited

U.S. PATENT DOCUMENTS

| | | |
|---|---|---|
| 2012/0144335 A1 | 6/2012 | Abeln et al. |
| 2012/0158527 A1 | 6/2012 | Cannelongo et al. |
| 2012/0159307 A1 | 6/2012 | Chung et al. |
| 2012/0159362 A1 | 6/2012 | Brown et al. |
| 2012/0159399 A1 | 6/2012 | Bastide et al. |
| 2012/0169593 A1 | 7/2012 | Mak et al. |
| 2012/0170847 A1 | 7/2012 | Tsukidate |
| 2012/0173381 A1 | 7/2012 | Smith |
| 2012/0173985 A1 | 7/2012 | Peppel |
| 2012/0180002 A1 | 7/2012 | Campbell et al. |
| 2012/0191502 A1 | 7/2012 | Gross et al. |
| 2012/0191786 A1* | 7/2012 | Downing ............ G06Q 10/107 709/206 |
| 2012/0196557 A1 | 8/2012 | Reich et al. |
| 2012/0196558 A1 | 8/2012 | Reich et al. |
| 2012/0197651 A1 | 8/2012 | Robinson et al. |
| 2012/0203708 A1 | 8/2012 | Psota et al. |
| 2012/0208636 A1 | 8/2012 | Feige |
| 2012/0215784 A1 | 8/2012 | King et al. |
| 2012/0215898 A1 | 8/2012 | Shah et al. |
| 2012/0218305 A1 | 8/2012 | Patterson et al. |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0226523 A1 | 9/2012 | Weiss |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0284345 A1 | 11/2012 | Costenaro et al. |
| 2012/0284791 A1 | 11/2012 | Miller et al. |
| 2012/0290879 A1 | 11/2012 | Shibuya et al. |
| 2012/0296907 A1 | 11/2012 | Long et al. |
| 2012/0310831 A1 | 12/2012 | Harris et al. |
| 2012/0310838 A1 | 12/2012 | Harris et al. |
| 2012/0311684 A1 | 12/2012 | Paulsen et al. |
| 2012/0323888 A1 | 12/2012 | Osann, Jr. |
| 2012/0330801 A1 | 12/2012 | McDougal et al. |
| 2012/0330973 A1 | 12/2012 | Ghuneim et al. |
| 2013/0006426 A1 | 1/2013 | Healey et al. |
| 2013/0006655 A1 | 1/2013 | Van Arkel et al. |
| 2013/0006668 A1 | 1/2013 | Van Arkel et al. |
| 2013/0006725 A1 | 1/2013 | Simanek et al. |
| 2013/0006916 A1 | 1/2013 | McBride et al. |
| 2013/0016106 A1 | 1/2013 | Yip et al. |
| 2013/0018796 A1 | 1/2013 | Kolhatkar et al. |
| 2013/0019306 A1 | 1/2013 | Lagar-Cavilla et al. |
| 2013/0024268 A1 | 1/2013 | Manickavelu |
| 2013/0024307 A1 | 1/2013 | Fuerstenberg et al. |
| 2013/0024339 A1 | 1/2013 | Choudhuri et al. |
| 2013/0024520 A1* | 1/2013 | Siminoff ............ G06Q 10/107 709/206 |
| 2013/0046635 A1 | 2/2013 | Grigg et al. |
| 2013/0046842 A1 | 2/2013 | Muntz et al. |
| 2013/0050217 A1 | 2/2013 | Armitage |
| 2013/0054306 A1 | 2/2013 | Bhalla |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0096988 A1 | 4/2013 | Grossman et al. |
| 2013/0097482 A1 | 4/2013 | Marantz et al. |
| 2013/0097709 A1 | 4/2013 | Basavapatna et al. |
| 2013/0101159 A1 | 4/2013 | Chao et al. |
| 2013/0110746 A1 | 5/2013 | Ahn |
| 2013/0110822 A1 | 5/2013 | Ikeda et al. |
| 2013/0110876 A1 | 5/2013 | Meijer et al. |
| 2013/0110877 A1 | 5/2013 | Bonham et al. |
| 2013/0111320 A1 | 5/2013 | Campbell et al. |
| 2013/0117011 A1 | 5/2013 | Ahmed et al. |
| 2013/0117651 A1 | 5/2013 | Waldman et al. |
| 2013/0132381 A1 | 5/2013 | Chakrabarti et al. |
| 2013/0139268 A1 | 5/2013 | An et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0151453 A1 | 6/2013 | Bhanot et al. |
| 2013/0157234 A1 | 6/2013 | Gulli et al. |
| 2013/0160120 A1 | 6/2013 | Malaviya et al. |
| 2013/0166348 A1 | 6/2013 | Scotto |
| 2013/0166480 A1 | 6/2013 | Popescu et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0185245 A1 | 7/2013 | Anderson |
| 2013/0185307 A1 | 7/2013 | El-Yaniv et al. |
| 2013/0197925 A1 | 8/2013 | Blue |
| 2013/0211985 A1 | 8/2013 | Clark et al. |
| 2013/0218879 A1* | 8/2013 | Park ............ G06F 17/30241 707/724 |
| 2013/0224696 A1 | 8/2013 | Wolfe et al. |
| 2013/0225212 A1 | 8/2013 | Khan |
| 2013/0226318 A1 | 8/2013 | Procyk |
| 2013/0226953 A1 | 8/2013 | Markovich et al. |
| 2013/0232045 A1 | 9/2013 | Tai et al. |
| 2013/0238616 A1 | 9/2013 | Rose et al. |
| 2013/0239217 A1 | 9/2013 | Kindler et al. |
| 2013/0246170 A1 | 9/2013 | Gross et al. |
| 2013/0246537 A1 | 9/2013 | Gaddala |
| 2013/0246597 A1* | 9/2013 | Iizawa ............ H04L 69/40 709/223 |
| 2013/0251233 A1 | 9/2013 | Yang et al. |
| 2013/0208565 A1 | 10/2013 | Castellanos et al. |
| 2013/0262527 A1 | 10/2013 | Hunter et al. |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0276799 A1 | 10/2013 | Davidson |
| 2013/0279757 A1 | 10/2013 | Kephart |
| 2013/0282696 A1 | 10/2013 | John et al. |
| 2013/0290011 A1 | 10/2013 | Lynn et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0311375 A1 | 11/2013 | Priebatsch |
| 2013/0318594 A1 | 11/2013 | Hoy et al. |
| 2013/0325859 A1 | 12/2013 | Porter |
| 2013/0339218 A1 | 12/2013 | Subramanian et al. |
| 2014/0006109 A1 | 1/2014 | Callioni et al. |
| 2014/0012796 A1 | 1/2014 | Petersen et al. |
| 2014/0013451 A1 | 1/2014 | Kulka et al. |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0058763 A1 | 2/2014 | Zizzamia et al. |
| 2014/0058914 A1* | 2/2014 | Song ............ G06Q 40/06 705/35 |
| 2014/0059038 A1 | 2/2014 | McPherson et al. |
| 2014/0059683 A1 | 2/2014 | Ashley |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0081652 A1 | 3/2014 | Klindworth |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0122456 A1 | 5/2014 | Dies |
| 2014/0122501 A1* | 5/2014 | Shen ............ G06Q 10/10 707/748 |
| 2014/0123279 A1 | 5/2014 | Bishop et al. |
| 2014/0129261 A1 | 5/2014 | Bothwell et al. |
| 2014/0136285 A1 | 5/2014 | Carvalho |
| 2014/0143009 A1 | 5/2014 | Brice et al. |
| 2014/0149130 A1 | 5/2014 | Getchius |
| 2014/0149272 A1 | 5/2014 | Hirani et al. |
| 2014/0149436 A1 | 5/2014 | Bahrami et al. |
| 2014/0156527 A1 | 6/2014 | Grigg et al. |

(56) References Cited

U.S. PATENT DOCUMENTS

| | | |
|---|---|---|
| 2014/0157172 A1 | 6/2014 | Peery et al. |
| 2014/0164502 A1 | 6/2014 | Khodorenko et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0222793 A1 | 8/2014 | Sadkin et al. |
| 2014/0229554 A1* | 8/2014 | Grunin .............. H04L 51/34 709/206 |
| 2014/0244388 A1 | 8/2014 | Manouchehri et al. |
| 2014/0258246 A1 | 9/2014 | Lo Faro et al. |
| 2014/0267294 A1 | 9/2014 | Ma |
| 2014/0267295 A1 | 9/2014 | Sharma |
| 2014/0279824 A1 | 9/2014 | Tamayo |
| 2014/0283107 A1 | 9/2014 | Walton et al. |
| 2014/0310266 A1 | 10/2014 | Greenfield |
| 2014/0310282 A1 | 10/2014 | Sprague et al. |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0351070 A1 | 11/2014 | Christner et al. |
| 2014/0358829 A1 | 12/2014 | Hurwitz |
| 2014/0366132 A1 | 12/2014 | Stiansen et al. |
| 2015/0019394 A1 | 1/2015 | Unser et al. |
| 2015/0039565 A1 | 2/2015 | Lucas |
| 2015/0046870 A1 | 2/2015 | Goldenberg et al. |
| 2015/0073929 A1 | 3/2015 | Psota et al. |
| 2015/0073954 A1 | 3/2015 | Braff |
| 2015/0081803 A1* | 3/2015 | Dick .............. G06Q 10/107 709/206 |
| 2015/0089424 A1 | 3/2015 | Duffield et al. |
| 2015/0095773 A1* | 4/2015 | Gonsalves .......... G06F 9/4446 715/709 |
| 2015/0100897 A1 | 4/2015 | Sun et al. |
| 2015/0100907 A1 | 4/2015 | Erenrich et al. |
| 2015/0106170 A1 | 4/2015 | Bonica |
| 2015/0106379 A1 | 4/2015 | Elliot et al. |
| 2015/0128274 A1 | 5/2015 | Giokas |
| 2015/0134599 A1 | 5/2015 | Banerjee et al. |
| 2015/0134666 A1 | 5/2015 | Gattiker et al. |
| 2015/0135256 A1* | 5/2015 | Hoy .............. H04L 63/101 726/1 |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178825 A1 | 6/2015 | Huerta |
| 2015/0178877 A1 | 6/2015 | Bogomolov et al. |
| 2015/0186532 A1 | 7/2015 | Agarwal et al. |
| 2015/0186821 A1 | 7/2015 | Wang et al. |
| 2015/0187036 A1 | 7/2015 | Wang et al. |
| 2015/0188715 A1 | 7/2015 | Castelluci et al. |
| 2015/0188872 A1* | 7/2015 | White .............. H04L 51/28 709/206 |
| 2015/0227295 A1 | 8/2015 | Meiklejohn et al. |
| 2015/0227518 A1 | 8/2015 | Kallan |
| 2015/0229664 A1 | 8/2015 | Hawthorn et al. |
| 2015/0235334 A1 | 8/2015 | Wang et al. |
| 2015/0242401 A1 | 8/2015 | Liu |
| 2015/0248563 A1 | 9/2015 | Alfarano et al. |
| 2015/0261847 A1 | 9/2015 | Ducott et al. |
| 2015/0324868 A1 | 11/2015 | Kaftan et al. |
| 2015/0326601 A1 | 11/2015 | Grondin et al. |
| 2015/0338233 A1 | 11/2015 | Cervelli et al. |
| 2015/0347903 A1 | 12/2015 | Saxena et al. |
| 2015/0370888 A1 | 12/2015 | Fonseca et al. |
| 2015/0378996 A1 | 12/2015 | Kesin et al. |
| 2015/0379413 A1 | 12/2015 | Robertson et al. |
| 2016/0004764 A1 | 1/2016 | Chakerian et al. |
| 2016/0004864 A1 | 1/2016 | Falk et al. |
| 2016/0028759 A1 | 1/2016 | Visbal |
| 2016/0034470 A1 | 2/2016 | Sprague et al. |
| 2016/0034545 A1 | 2/2016 | Shankar et al. |
| 2016/0048937 A1 | 2/2016 | Mathura et al. |
| 2017/0277780 A1 | 9/2017 | Kesin et al. |
| 2018/0101594 A1 | 4/2018 | Chakerian et al. |

FOREIGN PATENT DOCUMENTS

| | | |
|---|---|---|
| CN | 102546446 | 7/2012 |
| CN | 103167093 | 6/2013 |
| CN | 103281301 | 9/2013 |
| CN | 102054015 | 5/2014 |
| DE | 102014103482 | 9/2014 |
| DE | 102014204827 | 9/2014 |
| DE | 102014204830 | 9/2014 |
| DE | 102014204834 | 9/2014 |
| DE | 102014215621 | 2/2015 |
| EP | 1191463 | 3/2002 |
| EP | 1672527 | 6/2006 |
| EP | 1962222 | 8/2008 |
| EP | 2487610 | 8/2012 |
| EP | 2551799 | 1/2013 |
| EP | 2555153 | 2/2013 |
| EP | 2560134 | 2/2013 |
| EP | 2778977 | 9/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2889814 | 7/2015 |
| EP | 2891992 | 7/2015 |
| EP | 2892197 | 7/2015 |
| EP | 2897051 | 7/2015 |
| EP | 2911078 | 8/2015 |
| EP | 2911100 | 8/2015 |
| EP | 2963577 | 1/2016 |
| EP | 2963578 | 1/2016 |
| EP | 2963595 | 1/2016 |
| EP | 2985974 | 2/2016 |
| EP | 2985974 | 4/2018 |
| GB | 2516155 | 1/2015 |
| GB | 2518745 | 4/2015 |
| NL | 2012778 | 11/2014 |
| NL | 2013306 | 2/2015 |
| NL | 2011642 | 8/2015 |
| NZ | 624557 | 12/2014 |
| WO | WO 2000/009529 | 2/2000 |
| WO | WO 2002/065353 | 8/2002 |
| WO | WO 2005/010685 | 2/2005 |
| WO | WO 2005/104736 | 11/2005 |
| WO | WO 2005/116851 | 12/2005 |
| WO | WO 2008/011728 | 1/2008 |
| WO | WO 2008/064207 | 5/2008 |
| WO | WO 2008/113059 | 9/2008 |
| WO | WO 2009/061501 | 5/2009 |
| WO | WO 2010/000014 | 1/2010 |
| WO | WO 2010/030913 | 3/2010 |
| WO | WO 2013/010157 | 1/2013 |
| WO | WO 2013/102892 | 7/2013 |
| WO | WO 2013/126281 | 8/2013 |

OTHER PUBLICATIONS

Appacts, "Smart Thinking for Super Apps,", http://www.appacts.com, accessed online on Jul. 18, 2013 (4 pages).

Apsalar, "Data Powered Mobile Advertising," "Free Mobile App Analytics" and various analytics related screen shots, http://apsalar.com, accessed online on Jul. 18, 2013 (8 pages).

(56) References Cited

OTHER PUBLICATIONS

Capptain—Pilot Your Apps, <http://www.capptain.com, accessed online on Jul. 18, 2013 (6 pages).
Countly Mobile Analytics, <http://count.ly/>, accessed online on Jul. 18, 2013 (9 pages).
Distimo—App Analytics, <http://www.distimo.com/app-analytics>, accessed online on Jul. 18, 2013 (5 pages).
Flurry Analytics, <http://www.flurry.com/>, accessed online on Jul. 18, 2013 (14 pages).
Google Analytics Official Website—Web Analytics & Reporting, <http://www.google.com/analytics.index.html>, accessed online on Jul. 18, 2013 (22 pages).
Kontagent Mobile Analytics, <http://www.kontagent.com/>, accessed online on Jul. 18, 2013 (9 pages).
Localytics—Mobile App Marketing & Analytics, <http://www.localytics.com/>, accessed online on Jul. 18, 2013 (12 pages).
Mixpanel—Mobile Analytics, <https://mixpanel.com/>, accessed online on Jul. 18, 2013 (13 pages).
Open Web Analytics (OWA), <http://www.openwebanalytics.com/>, accessed online on Jul. 19, 2013 (5 pages).
Piwik—Free Web Analytics Software, <http://piwik.org/>, accessed online on Jul. 19, 2013 (18 pages).
StatCounter—Free Invisible Web Tracker, Hit Counter and Web Stats, <http://statcounter.com/>, accessed online on Jul. 19, 2013 (17 pages).
TestFlight—Beta Testing on the Fly, <http://testflightapp.com/>, accessed online on Jul. 18, 2013 (3 pages).
trak.io, <http://trak.io/>, accessed online on Jul. 18, 2013 (3 pages).
UserMetrix, <http://usermetrix.com/android-analytics/>, accessed online on Jul. 18, 2013 (3 pages).
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-c553-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn et al., "Semi-supervised Clustering with User Feedback," Constrained Clustering: Advances in Algorithms, Theory, and Applications 4.1, 2003, pp. 17-32.
Gorr et al., "Crime Hot Spot Forecasting: Modeling and Comparative Evaluation," Grant 98-IJ-CX-K005, May 6, 2002, 37 pages.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Manno et al., "Introducing Collaboration in Single-user Applications through the Centralized Control Architecture," 2010, pp. 10.

"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Sigrist et al., "Prosite, a Protein Domain Database for Functional Characterization and Annotation," Nucleic Acids Research 38.Suppl 1, 2010, pp. D161-D166.
Valentini et al., "Ensembles of Learning Machines," M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Notice of Allowance for U.S. Appl. No. 14/479,863 dated Mar. 31, 2015.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/552,336 dated Nov. 3, 2015.
Official Communication for U.S. Appl. No. 14/225,160 dated Jul. 29, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 14/451,221 dated Oct. 21, 2014.
Official Communication for U.S. Appl. No. 14/225,160 dated Oct. 22, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/571,098 dated Mar. 11, 2015.
Official Communication for U.S. Appl. No. 14/225,160 dated May 20, 2015.
Official Communication for U.S. Appl. No. 14/463,615 dated May 21, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/225,160 dated Aug. 12, 2015.

(56) References Cited

OTHER PUBLICATIONS

Official Communication for U.S. Appl. No. 14/571,098 dated Aug. 24, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/746,671 dated Nov. 12, 2015.
Official Communication for U.S. Appl. No. 14/842,734 dated Nov. 19, 2015.
Official Communication for U.S. Appl. No. 14/306,138 dated Dec. 3, 2015.
Official Communication for U.S. Appl. No. 14/463,615 dated Dec. 9, 2015.
Official Communication for U.S. Appl. No. 14/800,447 dated Dec. 10, 2015.
Official Communication for U.S. Appl. No. 14/225,006 dated Dec. 21, 2015.
Official Communication for European Patent Application No. 14187996.5 dated Feb. 12, 2015.
Official Communication for European Patent Application No. 14200298.9 dated May 13, 2015.
Official Communication for European Patent Application No. 14191540.5 dated May 27, 2015.
Official Communication for European Patent Application No. 14200246.8 dated May 29, 2015.
Official Communication for European Patent Application No. 15181419.1 dated Sep. 29, 2015.
Official Communication for European Patent Application No. 15184764.7 dated Dec. 14, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622473 dated Jun. 19, 2014.
Official Communication for New Zealand Patent Application No. 628161 dated Aug. 25, 2014.
Baker et al., "The Development of a Common Enumeration of Vulnerabilities and Exposures," Presented at the Second International Workshop on Recent Advances in Intrusion Detection, Sep. 7-9, 1999, pp. 35.
Bhuyan et al., "Network Anomaly Detection: Methods, Systems and Tools," First Quarter 2014, IEEE.
Crosby et al., "Efficient Data Structures for Tamper-Evident Logging," Department of Computer Science, Rice University, 2009, pp. 17.
FireEye, <http://www.fireeye.com/> Printed Jun. 30, 2014 in 2 pages.
FireEye—Products and Solutions Overview, <http://www.fireeye.com/products-and-solutions> Printed Jun. 30, 2014 in 3 pages.
Glaab et al., "EnrichNet: Network-Based Gene Set Enrichment Analysis," Bioinformatics 28.18 (2012): pp. i451-i457.
Hur et al., "SciMiner: web-based literature mining tool for target identification and functional enrichment analysis," Bioinformatics 25.6 (2009): pp. 838-840.
Lee et al., "A Data Mining and CIDF Based Approach for Detecting Novel and Distributed Intrusions," Lecture Notes in Computer Science, vol. 1907 Nov. 11, 2000, pp. 49-65.
Ma et al., "A New Approach to Secure Logging," ACM Transactions on Storage, vol. 5, No. 1, Article 2, Published Mar. 2009, 21 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
VirusTotal—About, <http://www.virustotal.com/en/about/> Printed Jun. 30, 2014 in 8 pages.
Waters et al., "Building an Encrypted and Searchable Audit Log," Published Jan. 9, 2004, 11 pages, http://www.parc.com/content/attachments/building_encrypted_searchable_5059_parc.pdf.
Zheng et al., "Goeast: A web-based software toolkit for Gene Ontology enrichment analysis," Nucleic acids research 36.suppl 2 (2008): pp. W385-W363.
Official Communication for European Patent Application No. 14199180.2 dated Jun. 22, 2015.
Official Communication for European Patent Application No. 14199180.2 dated Aug. 31, 2015.
Official Communication for European Patent Application No. 15175106.2 dated Nov. 5, 2015.
Official Communication for European Patent Application No. 15180985.2 dated Jan. 15, 2016.
Notice of Allowance for U.S. Appl. No. 14/473,860 dated Jan. 5, 2015.
Notice of Allowance for U.S. Appl. No. 14/223,918 dated Jan. 6, 2016.
Notice of Allowance for U.S. Appl. No. 14/033,076 dated Mar. 11, 2016.
Notice of Allowance for U.S. Appl. No. 14/823,935 dated Apr. 25, 2016.
Notice of Allowance for U.S. Appl. No. 14/970,317 dated May 26, 2016.

(56) References Cited

OTHER PUBLICATIONS

Official Communication for U.S. Appl. No. 14/280,490 dated Jul. 24, 2014.
Official Communication for U.S. Appl. No. 14/490,612 dated Jan. 27, 2015.
Official Communication for U.S. Appl. No. 14/490,612 dated Mar. 31, 2015.
Official Communication for U.S. Appl. No. 14/223,918 dated Jun. 8, 2015.
Official Communication for U.S. Appl. No. 14/823,935 dated Dec. 4, 2015.
Official Communication for U.S. Appl. No. 14/970,317 dated Mar. 21, 2016.
Official Communication for U.S. Appl. No. 14/982,699 dated Mar. 25, 2016.
Official Communication for U.S. Appl. No. 14/816,748 dated Apr. 1, 2016.
Official Communication for U.S. Appl. No. 14/923,712 dated Feb. 12, 2016.
Official Communication for U.S. Appl. No. 14/731,312 dated Apr. 14, 2016.
Official Communication for U.S. Appl. No. 14/816,748 dated May 24, 2016.
Official Communication for U.S. Appl. No. 15/071,064 dated Jun. 16, 2016.
Definition "Identify", downloaded Jan. 22, 2015, 1 page.
Definition "Overlay", downloaded Jan. 22, 2015, 1 page.
About 80 Minutes, "Palantir in a Number of Parts—Part 6—Graph," Mar. 21, 2013, pp. 1-6.
Conner, Nancy, "Google Apps: The Missing Manual," May 1, 2008, pp. 15.
Gesher, Ari, "Palantir Screenshots in the Wild: Swing Sightings," The Palantir Blog, Sep. 11, 2007, pp. 1-12.
Nolan et al., "MCARTA: A Malicious Code Automated Run-Time Analysis Framework," Homeland Security, 2012 IEEE Conference on Technologies for, Nov. 13, 2012, pp. 13-17.
Palantir Technologies, "Palantir Labs—Timeline," Oct. 1, 2010, retrieved from the internet https://www.youtube.com/watch?v=JCgDW5bru9M.
Perdisci et al., "Behavioral Clustering of HTTP-Based Malware and Signature Generation Using Malicious Network Traces," USENIX, Mar. 18, 2010, pp. 1-14.
Shi et al., "A Scalable Implementation of Malware Detection Based on Network Connection Behaviors," 2013 International Conference on Cyber-Enabled Distributed Computing Knowledge Discovery, IEEE, Oct. 10, 2013, pp. 59-66.
Wright et al., "Palantir Technologies VAST 2010 Challenge Text Records_ Investigations into Arms Dealing," Oct. 29, 2010, pp. 1-10.

\* cited by examiner

SYSTEM AND METHOD FOR DETECTING CONFIDENTIAL INFORMATION EMAILS

BACKGROUND

Intellectual property is one of several key assets held by companies today. Accordingly, companies are always looking for ways to control their confidential and trade-secret information and to ensure that it is not disseminated to third parties. Most of that information is stored in a digital format nowadays, and can typically be accessed from electronic devices (e.g., desktops, laptops, tablet computers, smart phones, etc.) that are often provided by the company to its employees. While a company has some control and oversight over its own electronic devices, it loses any such control once the confidential information leaves the company device and is transferred to another device, such as a personal email account. Accordingly, identifying such transfer of confidential information can help the company better protect its intellectual property.

BRIEF DESCRIPTION OF THE DRAWINGS

Reference will now be made to the accompanying drawings which illustrate exemplary embodiments of the present disclosure. In the drawings.

DESCRIPTION OF EXEMPLARY EMBODIMENTS

As discussed above, it is a major concern of a company when confidential information is transferred (moved or copied) from a company device to another device. In such a situation, it is particularly concerning where a company employee sends information from his company device or account to his personal device or account. One example of this is an employee sending an email from the employee's corporate email account (accessing it either from a company device or another device) to the employee's personal email account. Such activity is particularly suspicious because it may indicate that an employee is deliberately transferring the information away from the company device or account, in order to later share it with a third party or otherwise misappropriate it. Therefore, it would be advantageous to have a system and a method for detecting emails sent from an employee's corporate email account to the employee's personal email account.

Reference will now be made in detail to several exemplary embodiments of the present disclosure, including those illustrated in the accompanying drawings. Whenever possible, the same reference numbers will be used throughout the drawings to refer to the same or like parts.

Figure 1:
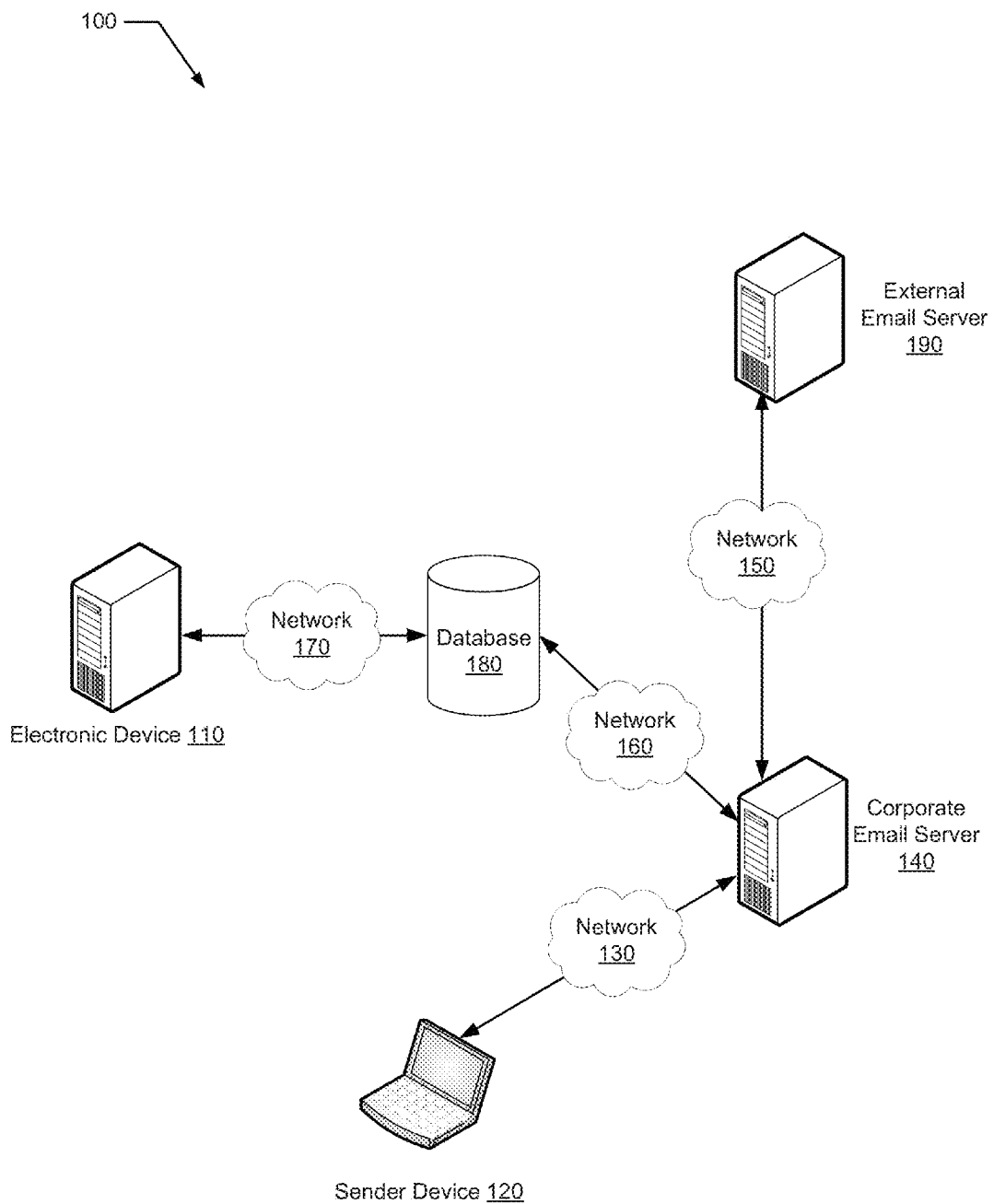
FIG. 1 is a block diagram of an exemplary system, consistent with embodiments of the present disclosure.

Reference is now made to FIG. 1, which illustrates, in block diagram form, an exemplary system 100. As shown in FIG. 1, system 100 can include, for example, an electronic device 110 coupled either directly or through a network 170 to a database 180, which is coupled either directly or through a network 160 to a corporate email server 140. System 100 can also include a sender device 120 that is coupled either directly or through a network 130 to corporate email server 140, which is coupled through a network 150 to one or more external email servers 190.

Database 180 can be any type of database that stores digital data. Database 180 can include an email database (not shown) storing email data obtained from corporate email server 140. Database 180 can also include a name database (not shown) storing name data in association with email address data. Database 180 can also include a nickname database (not shown) storing nickname data in association with name data. For example, the nickname database can include the following nicknames in association with the name Richard: Rich, Richie, Ricky, and Dick. The three databases discussed above are illustrated as being part of the same database 180, but it is appreciated that the three devices may or may not be a part of the same physical device, and can be located on different physical devices (e.g., servers) and on different networks. Moreover, it is appreciated that the information stored in the email database, name the database, and the nickname database can be accumulated in less than three databases. In some embodiments, database 180 can be implemented as a data fusion system 300, described in more detail below in FIG. 3, discussed in detail below.

The email database can store email data of all emails sent from sender device or process (e.g. automated emails) through corporate email server 140 or only some of those emails. For example, the email database can store all emails sent through corporate email server 140 within the last predefined period of time (e.g., the last day, the last week, etc.)

In some embodiments, database 180 can be stored on a separate server which can be accessed by electronic device 110 either directly or through network 170. In other embodiments, database 180 can be physically stored on corporate email server 140. In yet other embodiments, database 180 can be physically stored on electronic device 110. In some embodiments, parts of database 180 can be omitted. For example, database 180 may not include the email database, and the electronic device can obtain and process email data from corporate email server 140 in real time, as the emails are being sent.

Corporate email server 140 can be any type of an email server such as a Microsoft Exchange Server, Novell Groupwise, Open-Xchange, or any other email server that supports sending, storing, and/or receiving of emails. Corporate email server 140 can receive outgoing email data from sender device 120, identify, based on the outgoing email data, an appropriate external email server 190, and send the outgoing email data to the identified external email server 190. Corporate email server 140 could also be one or more servers in a chain of email servers that route messages from the sender to the external email server.

External email server 190 can be any type of one or more email servers that can be accessed by users directly or remotely (e.g., via the Internet), receive and store incoming emails, and/or send outgoing emails. Examples of external email servers 190 include popular servers open to the public, such as Gmail, Yahoo Mail, Hotmail, as well as proprietary email servers serving one or a limited number of users, such as an email server running on a user's personal computer.

An email server, such as corporate email server 140 or external email server 190, can be associated with one or more IP addresses (e.g., "68.142.240.31") that uniquely identify the server within its network (e.g., the Internet). An email server can also be associated with one or more domain names (e.g., "yahoo.com"). For brevity purposes, IP addresses and domain names will be collectively referred to herein as "domain names."

Electronic device 110 can be one or more electronic devices of any type that can obtain email data from corporate email server 140 either directly (not shown) or through database 180. Exemplary embodiments of electronic device 110 are discussed in more detail below, in connection with FIG. 4.

Networks 130, 150, 160, and 170, can each be any type of wireless and/or wired network such as a local area network (LAN) and/or a wide area network (WAN) (e.g., the Internet).

Sender device 120 can be a stationary electronic device (e.g., a PC) or a mobile electronic device (e.g., a cellular phone, a smartphone, a tablet, a netbook, a laptop, a PDA, etc.) or any other type of electronic device having a processor and capable of receiving input data, such as email data, from a user, and communicating with corporate email server 140, either directly or through network 130. Sender device 120 can be owned by a company and provided for an employee for the duration of employment, or it can be the employee's personal device. Sender device 120 can have an email client application that can facilitate receiving input data from the user and communicating with corporate email server 140. The email client application can be a standalone application such as Microsoft Outlook, an internet browser providing access to corporate email server 140 through web protocols (e.g., HTTP or HTTPS) or any other type of application.

In some embodiments, sender device 120 receives email data from a user (e.g., using the email client application), processes and optionally modifies the email data, and sends the (optionally modified) email data to corporate email server 140. Upon receiving the email data, corporate email server 140 can optionally modify the email data, identify, based on the email data, one or more external email servers to which the email data should be sent, and send a copy of the (optionally modified) email data to each of the identified external email servers. Corporate email server 140 can send the email data using a Simple Mail Transfer Protocol (SMTP), or using any other protocol suitable for sending email data. Each of the identified external email servers, upon receiving the email data can identify, based on the email data, one or more recipient users, and store the received email data in association with the identified recipient users. The recipient users can then log into their respective accounts at the identified external email servers, and retrieve the email data. The logging in and the retrieval can be implemented via protocols such as Post Office Protocol (POP), Internet Message Access Protocol (IMAP), via a web application, or using any other suitable method.

The email data can include, among other things, a subject, a body, one or more attachments (files), header information, one or more recipient addresses and a sender address.

Each recipient addresses can include, for example, a local part, an "at" sign ("@"), and a domain part. For example, in the electronic address "john.doe123@yahoo.com" the local part is "john.doe123" and the domain part is "yahoo.com". In some embodiments, the domain part of the recipient address can be associated with a particular external email server 190. For instance, in the above example, domain part "yahoo.com" is associated with an external email server belonging to Yahoo! Inc. In some embodiments, the local part of the recipient address can correspond to a username associated with one of the users of the external email servers associated with the domain part. For instance, in the above example, local part "john.doe123" can correspond to the username of a user (e.g., named John Doe) that has an email account on the external email server belonging to Yahoo! Inc. Accordingly, for purposes of brevity, the local part is hereinafter referred to as the "username."

The one or more recipient addresses within the email data can be entered by the user (e.g., from sender device 120 via the email client application) who can specify the addresses, for example, by typing them in manually, or by selecting them from an address book. In some embodiments, the user can designate each recipient addresses as a "TO" address, a "CC" address, or a "BCC" address.

As discussed above, corporate email server 140 can identify, based on the email data, one or more external email servers, and send each of these external email servers a copy of the email data. In some embodiments, corporate email server 140 identifies the external email servers by retrieving the recipient addresses from the email data, and determining (e.g., using a database) which external email servers are associated with the domain parts of the recipient addresses.

As discussed above, in addition to the one or more recipient addresses, the email data can include a sender address. The sender address can be input by the user manually, or it can be automatically added to the email data by either sender device 120 or corporate email server 140. In some embodiments, the sender address can have a local part (a username), an "at" ("@") sign, and a domain part, similarly to the recipient address, discussed above. In some embodiments, the domain part of the sender address can be associated with and uniquely identify corporate email server 140, either of the employee's company or one of its subsidiaries, parent, or sibling companies, or any other company associated with the employee's company. For example, a domain name associated with corporate email server of corporation Example can be "example.com". The username in the sender address is associated with the user sending the email data (e.g., a company employee).

In some embodiments, the username in the sender address can correspond to the user's real name. In addition, the username can be formatted in accordance with a predetermined format. The format can dictate, for example, that the username include the first and the last name of the user and be separated by a period (e.g., "john.doe"). As another example, the format can dictate that the username include the first initial and the last name of the user (e.g., "j.doe") or the first name and the last initial (e.g., "john.d"). Other formatting examples include "john," "jdoe," "doej," johnd," "djohn," and so forth. In yet other examples, the username can include additional characters such as underscores ("_"), dashes ("-"), digits (e.g., "john.doe1" and "john.doe2" where there are two or more employees named John Doe) or middle initials (again, for the scenario where there are several employees with the same first and last names).

Electronic device 110 can obtain the email that is being sent or was sent through corporate email server 140. In some embodiments, electronic device 110 can receive the email data in real time, simultaneously (or substantially simultaneously) with it being received by corporate email server 140 from sender device 120 and sent over to one or more external email servers 190. In other embodiments, the electronic device can obtain the email data from database 180. Database 180 can be updated (e.g., by corporate email server 140) any time an email is being sent through corporate email server 140, and database 180 can temporarily or permanently store email data of one or more such emails.

Figure 2:
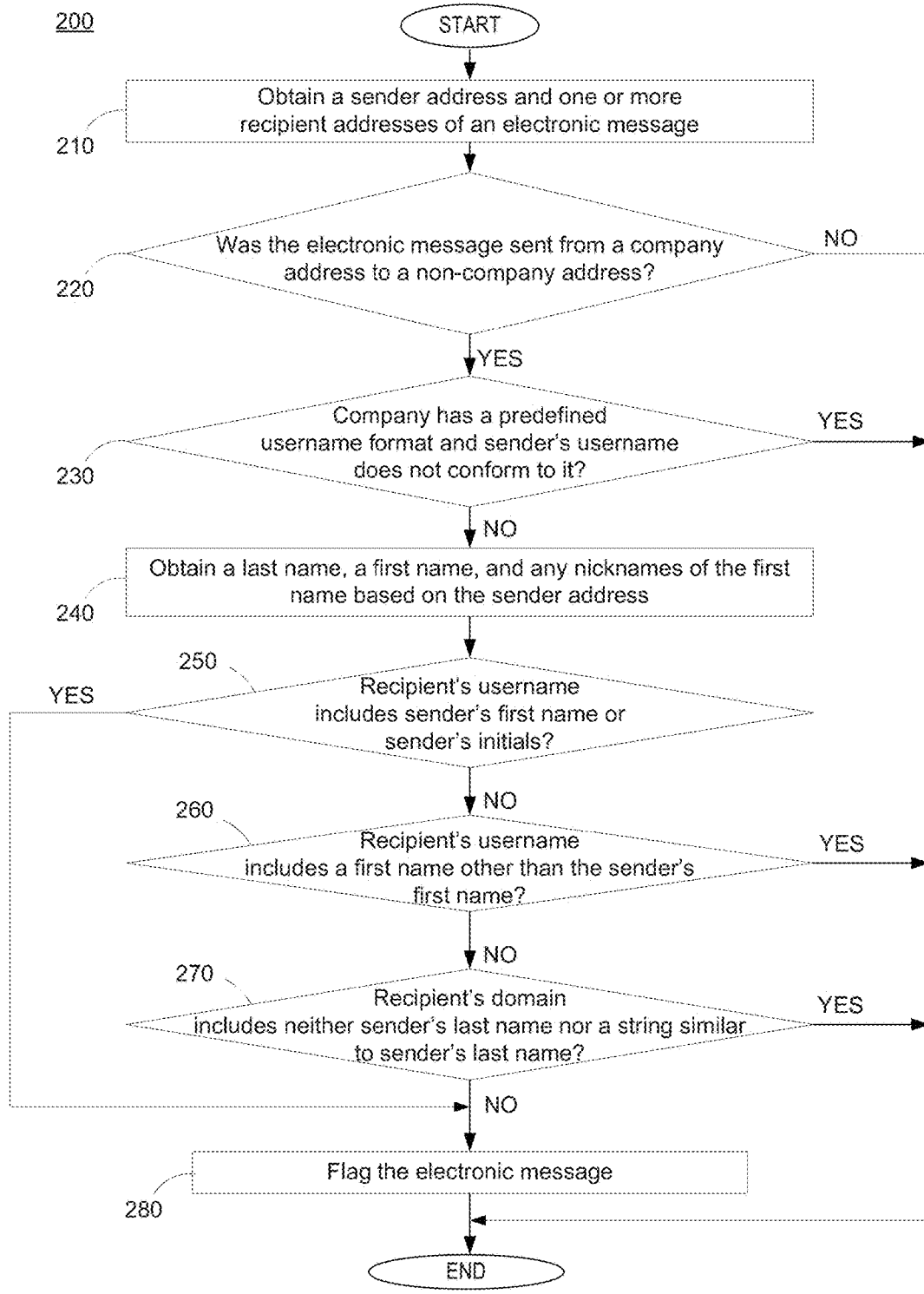
FIG. 2 is a flowchart of an exemplary method for detecting confidential information emails, consistent with embodiments of the present disclosure.

Referring now to FIG. 2, a flowchart representing an exemplary method 200 for detecting confidential information emails is presented. Method 200 can be performed by one or more electronic devices, such as electronic device 110. While method 200 and the other following embodiments described herein can be performed by multiple electronic devices, for purposes of simplicity and without limitation, these embodiments will be explained with respect to a single electronic device. While the flowchart discloses the following steps in a particular order, it will be appreciated that at least some of the steps can be moved, modified, or deleted where appropriate, consistent with the teachings of the present disclosure.

At step 210, the electronic device obtains an electronic message (e.g., an email). The electronic message can be obtained from any source, such as a database (e.g., the email database in database 180) that contains one or more electronic messages. After obtaining the electronic message, the electronic device extracts from the electronic message a sender address and one or more recipient addresses. As discussed above, the sender address and the recipient addresses can each include a username portion and a domain name portion.

At step 220, the electronic device determines whether the electronic message was sent from a company address to a non-company address. To make this determination, the electronic device can obtain a list of one or more domain names associated with a given company (or companies associated therewith), or more particularly, domain names associated with one or more corporate email servers associated with the company (or companies associated therewith). The electronic device can then determine whether the domain name portion of the sender address is within the list of domain names associated with the company. If not, the electronic message was probably not sent from a corporate account, and the electronic device can discard this electronic message and end the method.

Still referring to step 220, the electronic device can also determine whether the electronic message has more than one recipient address. Since most suspicious messages are those sent to one recipient, messages that have multiple recipient addresses can be discarded and the electronic device can end the method. In some embodiments (not shown), the electronic device may not discard such messages, accounting for the possibility that the user has several personal accounts and that the user sent confidential information to more than one personal account or to a group of co-conspirators. For brevity purposes, and without limiting the scope of the disclosure, it will be assumed in the following examples that a message with multiple recipients is not a suspicious electronic message and is discarded at step 220.

Still referring to step 220, the electronic device can determine whether the (only) recipient address has a domain name that is within the list of domain names associated with the company. Because this indicates that the message was sent to someone within the company, such message can be discarded and the method can end. It will be appreciated that the above determinations of step 220 can be performed in any order. If the answer to all these determinations is "no," the method can proceed to step 230.

At step 230, the electronic device can determine whether the username of the sender address does not conform to any predefined format for all usernames associated with the company's employees. If the sender's username does not conform to the predefined company format this can mean, for example, that the message was automatically generated by a company computer. For example, it could be an automatic message sent from a sender address "donotreply@example.com." So if the username does not conform to the format, the electronic device can discard the electronic message and the method can end. For example, if a company has a predefined format dictating that all company usernames must include a period ("."), the electronic device can discard all messages whose sender address username does not include a period. Another example of a predefined format can be that all usernames must start with one alphabetic character, must be followed by a period, followed by at least two alphabetic characters, and followed by any number of alphanumeric characters. If the company does not have a predefined format or if the sender's username does conform to the predefined format, the method can proceed to step 240.

At step 240, the electronic device can obtain, based on the sender address, the sender's first name, middle name, last name, and any nicknames (or synonyms) of the first name. In some embodiments, the electronic device can obtain the sender's first, middle, and last names by extracting them from the sender address. For example, if the predefined company format discussed above is <first name>.<last name>@<company domain> then the first and last name (but not the middle name) of the sender can be extracted from the sender address.

In other embodiments, for higher reliability, the electronic device can obtain the first and last name of the sender by querying a database (e.g., the name database) that stores all employee usernames in association with their full names. The electronic device can send to the database the sender's username and receive back the sender's first name, last name, and optionally, a middle name or a middle initial.

Still referring to step 240, the electronic device can also obtain one or more nicknames associated with the sender's first name, for example, by querying a database (e.g., the nickname database). For purposes of brevity, the obtained first name and the obtained nicknames (if any) are collectively referred to as the sender's "first names." In some embodiments (not shown), in addition to retrieving nicknames for the first name, the electronic device can also obtain nicknames for the sender's middle name, and perform the next steps on nicknames that include the first name, the middle name, and any synonyms thereof.

At step 250, the electronic device can determine whether the recipient's username (the username portion of the recipient address) includes any of sender's first names obtained at step 240 or sender's initials. The electronic device can first remove from the recipient's username any non-alphabetic characters (e.g., digits, punctuation characters, spaces, etc.). The electronic device can then determine whether the remaining username includes sender's last name, and if so, remove the last name from the username. In some embodiments, if the electronic device determines that the last name is not included, it can further determine whether the remaining username either starts or ends with the sender's last initial, and if so, remove the last initial. The electronic device can then determine whether the remaining portion of the username corresponds to any of the first names (which includes any corresponding nicknames) of the sender. If it does, there is a high probability that the sender is sending the message to his own account (on an external email server), because the chances of someone sending a message to another person with the same first name are relatively low. Accordingly, if the remaining portion of the recipient's username corresponds to any of the first names, the electronic device can move to step 280.

If the remaining portion of the username does not contain any of the sender's first names, the electronic device can further determine whether the remaining portion of the username consists only of the sender's first initial (first letter of the first name or any corresponding nickname), of any combination of the sender's first initial and last initial, or of any combination of any two or all three of: the sender's first initial, last initial, and middle initial. If so, the electronic device can move to step 280. Otherwise, the method proceeds to step 260. In some embodiments, before proceeding to step 260, the processor further determines whether the remaining portion of the username includes the sender's first and last initials with one or two other characters (which could be initials) in between, and if so, the electronic device can move to step 280. Otherwise, the method proceeds to step 260.

At step 260, the electronic device can determine whether the username includes some first name other than any of sender's first names. For example, the electronic device can query the name database and/or the nickname databases to obtain all possible first names and their nicknames, and determine whether the remaining portion of the recipient's username includes any of those. If so, the electronic device can discard this message (as the recipient is likely to be a family member) and the method can end. Otherwise, the method proceeds to step 270.

At step 270, the electronic device can determine whether the recipient domain name includes the sender's last name. Because a person may have a personal domain name and personal domain names often include the person's last name (e.g., "smith.com," "thesmiths.net," etc.) a recipient domain name including the sender's last name can indicate that the message was sent to the sender's personal account. However, in some embodiments, if the employee has a last name shorter than a predefined threshold (e.g., 4 characters), step 270 can be skipped, as it could result in too many false positives (e.g. a last name "mai" could result in all emails sent to gmail.com being flagged).

If the electronic device determines, at step 270, that the recipient's domain name includes neither the sender's last name, it can discard the electronic message and the method can end. Otherwise, the electronic device can proceed to step 280.

In some embodiments, the electronic device can account for the possibility that the recipient's and/or the sender's first, middle, or last names can be misspelled. In these embodiments, when the electronic device determines in any of the steps of method 200 whether an email address (either recipient's or sender's, either in the username portion or the domain name portion) includes a particular name (either recipient's or sender's, either the last, the first, or the middle name) instead of determining whether the address includes the exact name, the processor can determine whether the address includes a string that is similar to the particular name. For example, the processor can determine whether the address includes a string that is within a predetermined edit distance, such as Levenshtein distance, from the particular name. For example, at step 270, the electronic device can determine whether the recipient domain name includes a string that is within a Levenshtein distance of 2 from the user's last name. Thus, the electronic device can determine that domain name "smitz.com" is similar to the sender's last name Smith, because "smitz" is within a Levenshtein distance of 1 from "smith." It is appreciated that any string operations (e.g., comparisons) in this and other steps of method 200 may or may not be case sensitive, encoding sensitive, or transliteration sensitive. For example, the processor can determine that the character "U" is equivalent to "u" and to "ü".

At step 280, the electronic device flags the electronic message. The flagging can include, for example, providing an indication (e.g., to an operator operating the electronic device) that the electronic message is "suspicious" and requires further review. For example, the electronic device can be coupled to a display, and can show on that display information identifying the electronic message (or the entire electronic message), and an indication to the operator that the identified electronic message is suspicious and needs to be evaluated for any confidential content inappropriately sent to an external server. The flagging can also include, for example, storing a copy of the electronic message in a predefined location, modifying the email database to indicate that this particular electronic message is suspicious and needs to be further evaluated, and/or flagging the electronic message as suspicious in an existing alerting or monitoring system. After step 280 the method can end.

After ending method 200, the electronic device can check if there are any additional unprocessed electronic messages in the database (e.g., database 180) and if so, perform method 200 on the next electronic message in the database. Moreover, in order to minimize processing, it is appreciated that method 200 can be performed across multiple electronic messages sent by a single sender address or received by a recipient address. For example, if there are several electronic messages sent by a single sender address to one or more recipient addresses, determination step 250 could be performed for all electronic messages from that single sender address before proceeding to determination step 260, where all remaining messages that have not been reported can be processed.

Furthermore, because, as discussed below, method 200 can be performed by one or more electronic devices, and because method 200 can process each electronic message in isolation, different electronic messages can be processed by different electronic devices, thereby spreading the computational load and reducing latency between the time that a message is sent and the time that method 200 is applied to it. For example, each new message can be given for processing to the first device that is not busy processing another message at the time.

In addition, because the method can determine whether the electronic message is suspicious or not based only on the recipient and/or sender addresses, and does not have to consider the electronic message's subject line, body, attachments, headers or any other information, the method can be performed in a minimal time and with minimal resources, allowing the processing of millions and even billions of emails within reasonable times.

Figure 3:
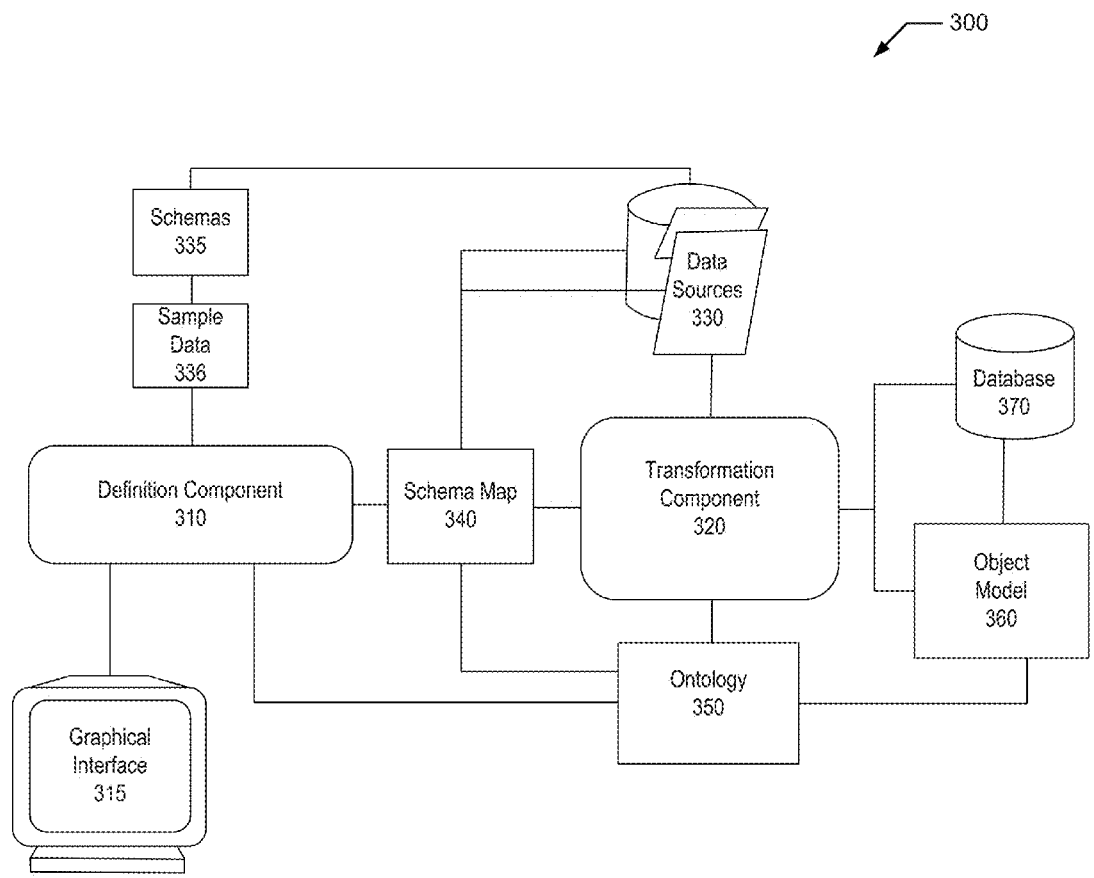
FIG. 3 is a block diagram of an exemplary data fusion system, consistent with embodiments of the present disclosure.

As discussed above, database 180 can, in some embodiments, be implemented as a data fusion system. In some embodiments, electronic device 110 and network 170 can also be included in the data fusion system. FIG. 3 shows, in block diagram form, an exemplary data fusion system 300, consistent with embodiments of the present disclosure. Among other things, system 300 facilitates transformation of one or more data sources, such as data sources 330, into an object model 360, whose semantics are defined by an ontology 350. The transformation can be performed for a variety of reasons. For example, a database administrator can wish to import data from data sources 330 into a database 370 for persistently storing object model 360. As another example, a data presentation component (not depicted) can transform input data from data sources 330

"on the fly" into object model 360. Object model 360 can then be utilized, in conjunction with ontology 350, for analysis through graphs and/or other data visualization techniques.

System 300 comprises a definition component 310 and a translation component 320, both implemented by one or more processors on one or more computing devices executing hardware and/or software-based logic for providing various functionality described herein. As will be appreciated from the present disclosure, system 300 can comprise fewer or additional components that provide various functionalities described herein. Such components are, for clarity, omitted from FIG. 3. Moreover, the component(s) of system 300 responsible for providing various functionalities can further vary from embodiment to embodiment.

Definition component 310 generates and/or modifies ontology 350 and a schema map 340. Exemplary embodiments for defining an ontology (such as ontology 350) are described in U.S. Pat. No. 7,962,495 (the '495 Patent), issued Jun. 14, 2011, the entire contents of which are expressly incorporated herein by reference. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring to FIG. 3, schema map 340 can define how various elements of schemas 335 for data sources 330 map to various elements of ontology 350. Definition component 310 receives, calculates, extracts, or otherwise identifies schemas 335 for data sources 330. Schemas 335 define the structure of data sources 330—for example, the names and other characteristics of tables, files, columns, fields, properties, and so forth. Definition component 310 furthermore optionally identifies sample data 336 from data sources 330. Definition component 310 can further identify object type, relationship, and property definitions from ontology 350, if any already exist. Definition component 310 can further identify pre-existing mappings from schema map 340, if such mappings exist.

Based on the identified information, definition component 310 can generate a graphical interface 315. Graphical interface 315 can be presented to users of a computing device via any suitable output mechanism (e.g., a display screen, an image projection, etc.), and can further accept input from users of the computing device via any suitable input mechanism (e.g., a keyboard, a mouse, a touch screen interface). Graphical interface 315 features a visual workspace that visually depicts representations of the elements of ontology 350 for which mappings are defined in schema map 340. Graphical interface 315 also includes controls for adding new elements to schema map 340 and/or ontology 350, including objects, properties of objects, and relationships, via the visual workspace. After elements of ontology 350 are represented in the visual workspace, graphical interface 315 can further provide controls in association with the representations that allow for modifying the elements of ontology 350 and identifying how the elements of ontology 350 correspond to elements of schemas 335. Optionally, the graphical interface 315 can further utilize sample data 336 to provide the user with a preview of object model 360 as the user defines schema map 340. In response to the input via the various controls of graphical interface 315, definition component 310 can generate and/or modify ontology 350 and schema map 340.

In some embodiments, graphical interface 315 can provide an interface providing a user with the ability to add structure to an unstructured document stored in data sources 330 by tagging one or more portions (e.g., text) within the document. Defining tags and applying these tags to a portion of the document can create object, properties, or links creating a relationship between one or more objects and/or properties.

Transformation component 320 can be invoked after schema map 340 and ontology 350 have been defined or redefined. Transformation component 320 identifies schema map 340 and ontology 350. Transformation component 320 further reads data sources 330 and identifies schemas 335 for data sources 330. For each element of ontology 350 described in schema map 340, transformation component 320 iterates through some or all of the data items of data sources 330, generating elements of object model 360 in the manner specified by schema map 340. In some embodiments, transformation component 320 can store a representation of each generated element of object model 360 in a database 370. In some embodiments, transformation component 320 is further configured to synchronize changes in object model 360 back to data sources 330.

Data sources 330 can be one or more sources of data, including, without limitation, spreadsheet files, databases, email folders, document collections, media collections, contact directories, and so forth. Data sources 330 can include structured data (e.g., a database, a .csv file, or any tab delimited or fixed-width file), semi-structured data (e.g., an email, an email server, or forms such as a suspicious activity report or currency transaction report), or unstructured data (e.g., encoded files such as PDF, sound, and image files). Data sources 330 can include data structures stored persistently in non-volatile memory. Data sources 330 can also or alternatively include temporary data structures generated from underlying data sources via data extraction components, such as a result set returned from a database server executing a database query. Data sources 330 can include or be synchronized with external data sources, such as one or more mobile location registers 112 and/or other location registers 116.

In some embodiments, data sources 330 can include any or all of the data of database 180 discussed above in connection with FIG. 1. Thus, data sources 330 can include, for example, the email database, the name database, and the nickname database discussed above.

Schema map 340, ontology 350, and schemas 335 can be stored in any suitable data structure(s), such as XML files, database tables, and so forth. In some embodiments, ontology 350 is maintained persistently. Schema map 340 can or cannot be maintained persistently, depending on whether the transformation process is perpetual or a one-time event. Schemas 335 need not be maintained in persistent memory, but can be cached for optimization.

Object model 360 comprises collections of elements such as typed objects, properties, and relationships. The collections can be structured in any suitable manner. In some embodiments, a database 370 stores the elements of object model 360, or representations thereof. In some embodiments, the elements of object model 360 are stored within database 370 in a different underlying format, such as in a series of object, property, and relationship tables in a relational database.

According to some embodiments, the operations, techniques, and/or components described herein can be implemented by the electronic device (e.g., electronic device 110), which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 4:
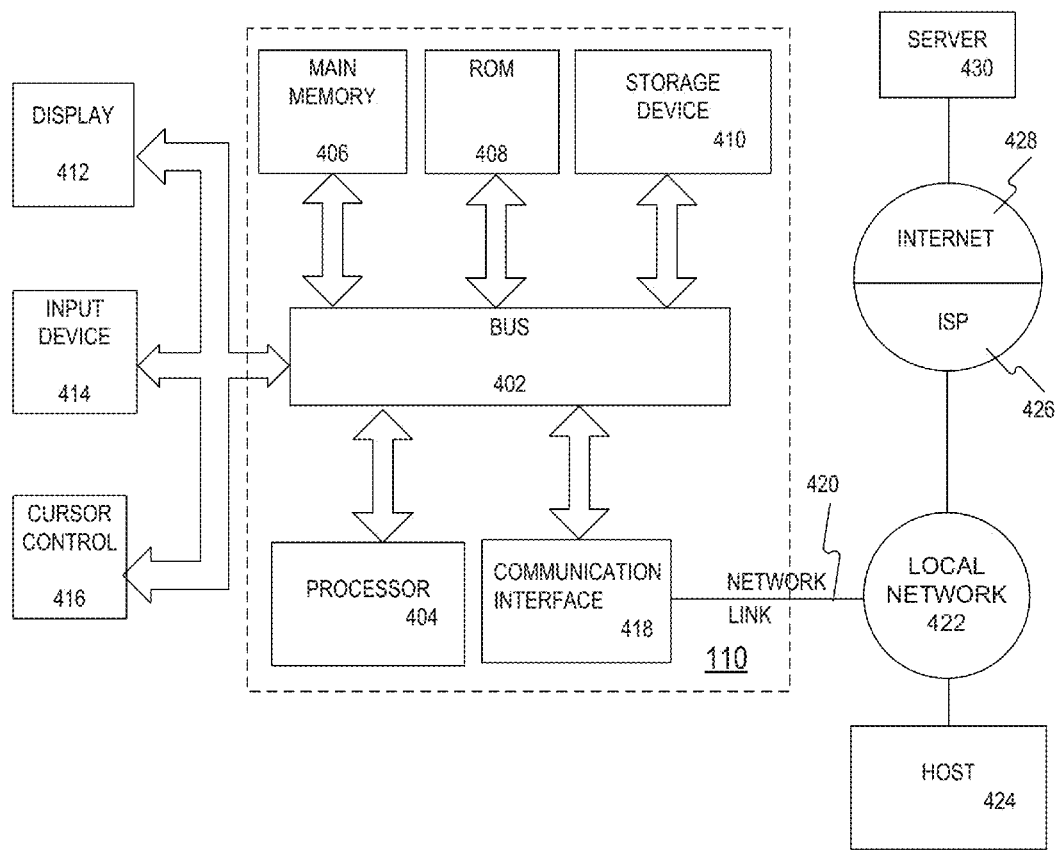
FIG. 4 is block diagram of an exemplary electronic device with which embodiments of the present disclosure can be implemented.

By way of example, FIG. 4 is a block diagram that illustrates an implementation of electronic device 110, which, as described above, can comprise one or more electronic devices. Electronic device 110 includes a bus 402 or other communication mechanism for communicating information, and one or more hardware processors 404, coupled with bus 402 for processing information. One or more hardware processors 404 can be, for example, one or more general purpose microprocessors.

Electronic device 110 also includes a main memory 406, such as a random access memory (RAM) or other dynamic storage device, coupled to bus 402 for storing information and instructions to be executed by processor 404. Main memory 406 also can be used for storing temporary variables or other intermediate information during execution of instructions to be executed by processor 404. Such instructions, when stored in non-transitory storage media accessible to one or more processors 404, render electronic device 110 into a special-purpose machine that is customized to perform the operations specified in the instructions.

Electronic device 110 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

Electronic device 110 can be coupled via bus 402 to a display 412, such as a cathode ray tube (CRT), an LCD display, or a touchscreen, for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 110 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Pig. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 110 can implement the techniques and other features described herein using customized hard-wired logic, one or more ASICs or FPGAs, firmware and/or program logic which in combination with the electronic device causes or programs electronic device 110 to be a special-purpose machine. According to some embodiments, the techniques and other features described herein are performed by electronic device 110 in response to one or more processors 404 executing one or more sequences of one or more instructions contained in main memory 406. Such instructions can be read into main memory 406 from another storage medium, such as storage device 410. Execution of the sequences of instructions contained in main memory 406 causes processor 404 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media can be involved in carrying one or more sequences of one or more instructions to processor 404 for execution. For example, the instructions can initially be carried on a magnetic disk or solid state drive of a remote computer. The remote computer can load the instructions into its dynamic memory and send the instructions over a telephone line using a modem. A modem local to electronic device 110 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 can optionally be stored on storage device 410 either before or after execution by processor 404.

Electronic device 110 also includes a communication interface 418 coupled to bus 402. Communication interface 418 provides a two-way data communication coupling to a network link 420 that is connected to a local network 422. For example, communication interface 418 can be an integrated services digital network (ISDN) card, cable modem, satellite modem, or a modem to provide a data communication connection to a corresponding type of telephone line. As another example, communication interface 418 can be a local area network (LAN) card to provide a data communication connection to a compatible LAN. Wireless links can also be implemented. In any such implementation, communication interface 418 sends and receives electrical, electromagnetic or optical signals that carry digital data streams representing various types of information.

Network link 420 typically provides data communication through one or more networks to other data devices. For example, network link 420 can provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from electronic device 110, are example forms of transmission media.

Electronic device 110 can send messages and receive data, including program code, through the network(s), network link 420 and communication interface 418. In the Internet example, a server 430 might transmit a requested code for an application program through Internet 428, ISP 426, local network 422 and communication interface 418.

The received code can be executed by processor 404 as it is received, and/or stored in storage device 410, or other non-volatile storage for later execution.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the exemplary methods or processes disclosed herein.

What is claimed is:

1. An electronic device comprising:
one or more non-transitory computer-readable storage media configured to store instructions; and
one or more processors configured to execute the instructions stored on the one or more non-transitory computer-readable storage media to cause the electronic device to, upon one or more headers of an electronic message being received from a sender:
obtain a sender address associated with the sender of the electronic message, the sender address comprising a first username and a first domain name;
obtain a first name and a last name of the sender or a last initial of the sender from a database;
obtain a recipient address of the electronic message, the recipient address comprising a second username and a second domain name that is different from the first domain name;
determine, by inspecting the one or more headers of the electronic message, whether the recipient address and the sender address are different addresses of a same user, wherein the determination includes finding a mismatch between the first domain name and the second domain name and a match between at least part of the recipient address and at least part of one or more of: the sender address, the first name of the sender, and the last name of the sender; and
based on determining whether the recipient address and the sender address are different addresses of the same user, flag the electronic message as one sent from and received by the same user;
determine whether the electronic message, if delivered, communicates confidential content to an external server based at least on one or more of: a subject, a body, one or more attachments, header information, one or more recipient addresses, or the sender address.

2. The electronic device of claim 1, wherein the one or more processors are further configured to execute the instructions to cause the electronic device to:
determine whether the first username comprises the first name of the sender.

3. The electronic device of claim 1, wherein the one or more processors are further configured to execute the instructions to cause the electronic device to:
performing further analysis of one or more of: the one or more headers, a body, a subject, one or more attachments, one or more recipient addresses, and the sender address.

4. The electronic device of claim 1, wherein the one or more processors are further configured to execute the instructions to cause the electronic device to determine whether the sender address corresponds to the user's work address based on whether the first username conforms to a predefined format and based on whether the first domain name is within a predetermined list of one or more work domain names.

5. The electronic device of claim 1, wherein the one or more processors are further configured to execute the instructions to cause the electronic device to determine whether the second domain name is not within a predetermined list of one or more work domain names.

6. The electronic device of claim 1, wherein the one or more processors are further configured to execute the instructions to cause the electronic device to determine whether the second domain name comprises the last name of the user.

7. The electronic device of claim 1, wherein the one or more processors are further configured to execute the instructions to cause the electronic device to:
determine whether the sender address conforms to a predefined format.

8. The electronic device of claim 1, wherein the one or more processors are further configured to execute the instructions to cause the electronic device to:
determine whether the recipient address comprises a nickname.

9. The electronic device of claim 1, wherein the determination of whether the recipient address and the sender address are different addresses of the same user includes processing addresses that are within a predetermined edit distance from the sender address or the recipient address.

10. A method performed by at least one electronic device comprising one or more processors executing instructions stored on a non-transitory computer-readable storage media configured to store the instructions, the method comprising upon one or more headers of an electronic message being received from a sender:
obtaining a sender address associated with the sender of the electronic message, the sender address comprising a first username and a first domain name;
obtaining a first name of the sender a last name of the sender, one or more nicknames of the sender or a last initial of the sender from a database storing usernames and names;
obtaining a recipient address of the electronic message, the recipient address comprising a second username and a second domain name;
determining, by inspecting the one or more headers of the electronic message, whether the recipient address and the sender address are different addresses of a same user wherein the determination includes filtering at least one of: non-alphabetic characters, a last initial of the sender, and the last name of the sender, from the recipient address and comparing the filtered recipient address with at least one of the sender address, the first name of the sender, the last name of the sender, and the one or more nicknames of the sender, and wherein the second domain name of the recipient address is different from the first domain name; and
based on the determination of whether the recipient address and the sender address are different addresses of the same user, flagging the electronic message as one sent from and received by the same user;
determining whether the electronic message, if delivered, communicates confidential content to an external server based at least on one or more of: a subject, a body, one or more attachments, header information, one or more recipient addresses, or the sender address.

11. The method of claim 10, further comprising:
determining whether the first username comprises the first name of the sender.

12. The method of claim 10, further comprising:
determining whether the first username comprises a nickname associated with the first name of the sender.

13. The method of claim 10, further comprising:
performing further analysis of one or more of: the one or more headers, a body, a subject, one or more attachments, one or more recipient addresses, and the sender address.

14. The method of claim 10, further comprising determining whether the sender address corresponds to the user's work address based on whether the first username conforms to a predefined format and based on whether the first domain name is within a predetermined list of one or more work domain names.

15. The method of claim 10, further comprising determining whether the second domain name is not within a predetermined list of one or more work domain names.

16. The method of claim 10, further comprising determining whether the second domain name comprises the last name of the user.

17. A non-transitory computer-readable medium storing a set of instructions that are executable by one or more electronic devices, each having one or more processors, to cause the one or more electronic devices to perform a method, the method comprising upon one or more headers of an electronic message being received from a sender:
   obtaining a sender address associated with the sender of the electronic message, the sender address comprising a first username and a first domain name;
   obtaining a first name of the sender a last name of the sender, one or more nicknames of the sender or a last initial of the sender from a database storing usernames and names;
   obtaining a recipient address of the electronic message, the recipient address comprising a second username and a second domain name that is different from the first domain name;
   determining, by inspecting the one or more headers of the electronic message, whether the recipient address and the sender address are different addresses of a same user wherein the determination includes filtering at least one of: non-alphabetic characters, a last initial of the sender, and the last name of the sender, from the recipient address and comparing the filtered recipient address with at least one of the sender address, the first name of the sender, the last name of the sender, and the one or more nicknames of the sender, wherein the second domain name of the recipient address is different from the first domain name; and
   based on the determination of whether the recipient address and the sender address are different addresses of the same user, flagging the electronic message as one sent from and received by the same user;
   determining whether the electronic message, if delivered, communicates confidential content to an external server based at least on one or more of: a subject, a body, one or more attachments, header information, one or more recipient addresses, or the sender address.

18. The non-transitory computer-readable medium of claim 17, further comprising instructions executable by the one or more electronic devices to cause the one or more electronic devices to determine whether the first username comprises a nickname associated with the first name of the sender.

19. The non-transitory computer-readable medium of claim 17, further comprising instructions executable by the one or more electronic devices to cause the one or more electronic devices to perform further analysis of one or more of: the one or more headers, a body, a subject, one or more attachments, one or more recipient addresses, and the sender address.

20. The non-transitory computer-readable medium of claim 17, further comprising instructions executable by the one or more electronic devices to cause the one or more electronic devices to determine whether the second domain name is not within a predetermined list of one or more work domain names.

21. The non-transitory computer-readable medium of claim 17, further comprising instructions executable by the one or more electronic devices to cause the one or more electronic devices to determine whether the second domain name comprises the last name of the user.

* * * * *